US012753101B1

(12) United States Patent
Sharan et al.

(10) Patent No.: US 12,753,101 B1
(45) Date of Patent: Oct. 6, 2026

(54) SYSTEM AND METHOD EMBODIMENTS FOR TREATING PRODUCED WATER USING SUPERCRITICAL WATER DESALINATION COUPLED WITH SUPERCRITICAL WATER OXIDATION

(71) Applicant: Triad National Security, LLC, Los Alamos, NM (US)

(72) Inventors: Prashant Sharan, Santa Fe, NM (US); Alp Tugrul Findikoglu, Santa Fe, NM (US); Robert Patrick Currier, Santa Fe, NM (US); Rajinder Singh, White Rock, NM (US)

(73) Assignee: Triad National Security, LLC, Los Alamos, NM (US)

( * ) Notice: Subject to any disclaimer, the term of this patent is extended or adjusted under 35 U.S.C. 154(b) by 535 days.

(21) Appl. No.: 18/299,649

(22) Filed: Apr. 12, 2023

Related U.S. Application Data

(60) Provisional application No. 63/330,647, filed on Apr. 13, 2022.

(51) Int. Cl.

| | |
|---|---|
| ***B01D 3/06*** | (2006.01) |
| ***B01D 53/047*** | (2006.01) |
| ***C01B 3/34*** | (2006.01) |
| ***C01B 3/56*** | (2006.01) |
| ***C02F 1/06*** | (2023.01) |
| ***C02F 11/08*** | (2006.01) |
| *C02F 101/30* | (2006.01) |

(52) U.S. Cl.
CPC .............. *C02F 11/086* (2013.01); *B01D 3/06* (2013.01); *B01D 53/047* (2013.01); *C01B 3/34* (2013.01); *C01B 3/56* (2013.01); *C02F 1/06* (2013.01); *B01D 2256/16* (2013.01); *B01D 2257/504* (2013.01); *C01B 2203/0233* (2013.01); *C01B 2203/042* (2013.01); *C01B 2203/0475* (2013.01); *C01B 2203/0894* (2013.01); *C01B 2203/1241* (2013.01); *C02F 2101/30* (2013.01); *C02F 2303/10* (2013.01)

(58) Field of Classification Search
CPC ...... C02F 1/06; C02F 11/086; C02F 2101/30; C02F 2303/10; C01B 3/346; C01B 3/56; C01B 2203/0233; C01B 2203/042; C01B 2203/0475; C01B 2203/0894; C01B 2203/1241; B01D 3/06; B01D 53/047; B01D 2256/16; B01D 2257/504
USPC .......................................................... 210/761
See application file for complete search history.

(56) References Cited

U.S. PATENT DOCUMENTS

2019/0135626 A1 * 5/2019 Rafati ....................... C01B 3/00

* cited by examiner

*Primary Examiner* — Akash K Varma
(74) *Attorney, Agent, or Firm* — Klarquist Sparkman, LLP

(57) ABSTRACT

Disclosed herein are embodiments of a system that combines supercritical water desalination with supercritical water oxidation in an integrated system. Also disclosed are method embodiments for utilizing the system and for producing purified water using the combination of supercritical water desalination with supercritical water oxidation. In particular embodiments, the method results in zero liquid discharge and the system can be used to generate purified water in combination with electricity.

13 Claims, 12 Drawing Sheets

SYSTEM AND METHOD EMBODIMENTS FOR TREATING PRODUCED WATER USING SUPERCRITICAL WATER DESALINATION COUPLED WITH SUPERCRITICAL WATER OXIDATION

CROSS REFERENCE TO RELATED APPLICATION

This application claims the benefit of U.S. Provisional Application Ser. No. 63/330,647, entitled SYSTEM AND METHOD EMBODIMENTS FOR TREATING PRODUCED WATER USING SUPERCRITICAL WATER DESALINATION COUPLED WITH SUPERCRITICAL WATER OXIDATION, filed on Apr. 13, 2022, which is incorporated by reference herein.

ACKNOWLEDGMENT OF GOVERNMENT SUPPORT

This invention was made with government support under Contract No. 89233218CNA000001 awarded by the U.S. Department of Energy/National Nuclear Security Administration. The government has certain rights in the invention.

FIELD

The present disclosure is directed to method and system embodiments for treating contaminated water comprising an organic material using a supercritical water oxidation process coupled with a supercritical desalination process.

BACKGROUND

Many industries, such as the oil and gas industries, produce water as a by-product; however, the water often is contaminated with undesired materials, such as environmentally hazardous hydrocarbons, organic chemicals, and inorganic salts. Such industries can include the chemical industry, the mining industry, municipalities, the agricultural and farming industries, and the like. One particular example is "produced water" generated from oil and gas operations, which contains significant quantities of environmentally hazardous hydrocarbons, organic chemicals, and inorganic salts. Environmental regulations associated with above-ground disposal of such impaired water mandates that the produced water be treated and desalinated; however, industry standard desalination technologies are energy-intensive and mandate extensive and energy intensive produced water pre-treatment, including removal of hydrocarbons constituents. There exists a need in the art for a method and system that exhibits improved energy efficiency and that can be used to treat water produced by various sources and industries in a manner that lowers operational costs.

SUMMARY

Disclosed herein are embodiments of a system, comprising: a feed pump that pressurizes a feed water; a heater and/or a supercritical heat exchanger that is fluidly coupled to the feed pump to pre-heat the feed water expelled from the feed pump; a boiler that is fluidly coupled to the heater and/or the heat exchanger and that heats the feed water to provide supercritical water; a reactor that is fluidly coupled to the boiler, wherein the reactor comprises an oxidant capable of inducing supercritical water oxidation so as to provide a supercritical water product comprising supercritical water, a gas, a salt, or a combination thereof; and a separator that is fluidly coupled to the reactor, wherein the separator promotes separation of the supercritical water and the gas from the salt, wherein the salt is in the form of a hydrothermal concentrated brine.

Also disclosed herein are embodiments of a method, comprising: pressurizing and heating a feed water to produce supercritical water; exposing the supercritical water to an oxidant in a reactor to promote supercritical water oxidation and to provide a supercritical water product comprising a salt, a gas, or a combination thereof; performing supercritical water desalination by separating the salt from the supercritical water product using a separator, wherein the salt is in the form of a hydrothermal concentrated brine; using a portion of the supercritical water product obtained from the separator to pre-heat the feed water; producing vapor from the hydrothermal concentrated brine; using the vapor as a heat source for a power cycle, an evaporator, a heater that pre-heats the feed water, or any combination thereof; and isolating a distillate from a portion of the supercritical water product obtained from the separator.

Also disclosed herein are embodiments of a method, comprising: pressurizing and heating a feed water to produce supercritical water; exposing the supercritical water to an oxidant in a reactor to promote supercritical water oxidation and to produce a supercritical distillate and a brine; flashing the supercritical distillate in a flash tank to generate a salt-free vapor stream; reacting the salt-free vapor stream with natural gas in a steam methane reforming (SMR) reactor to produce a syngas, wherein the SMR reactor produces a hot flue gas; purifying the syngas into high-purity hydrogen gas with a water-gas shift reactor and a pressure swing adsorption unit; and sequestering carbon dioxide from the hot flue gas, wherein the pressurizing and heating the feed water includes heating the feed water with the hot flue gas.

The foregoing and other objects and features of the present disclosure will become more apparent from the following detailed description, which proceeds with reference to the accompanying figures.

DETAILED DESCRIPTION

Overview of Terms

Figure 1:
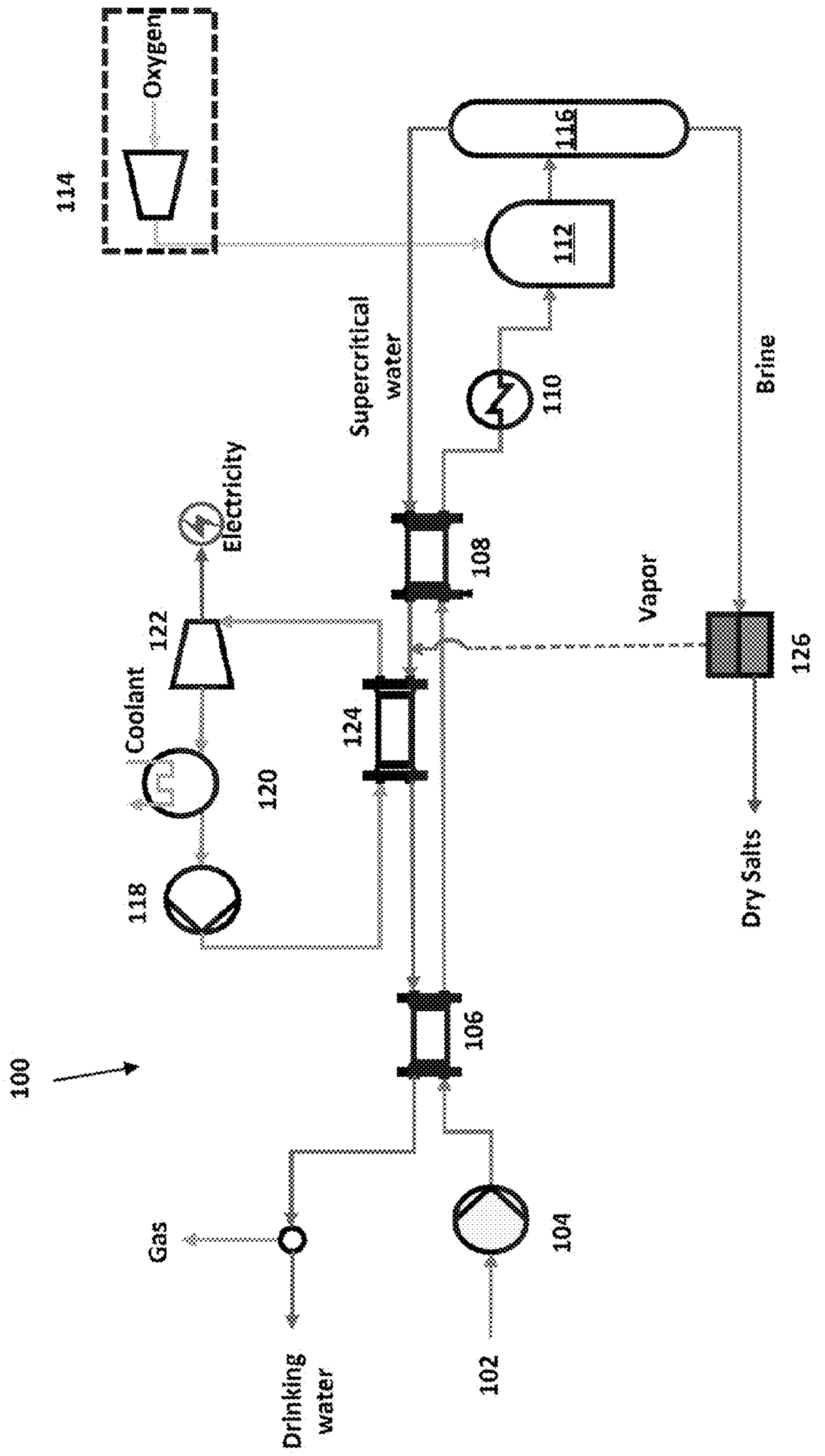
FIG. 1 is a schematic illustrating an exemplary integrated system embodiment for performing supercritical water oxidation (SCWO) in combination with supercritical water desalination (SCWD).

The following explanations of terms are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Also, the following description is exemplary in nature and is not intended to limit the scope, applicability, or configuration of the present disclosure. Various changes to the described embodiment may be made in the function and arrangement of the elements described herein without departing from the scope of the preset disclosure. Further, descriptions and disclosures provided in association with one particular embodiment are not limited to that embodiment, and may be applied to any embodiment disclosed. Further, the terms "coupled" and "associated" generally mean fluidly, electrically, and/or physically (e.g., mechanically or chemically) coupled or linked and does not exclude the presence of intermediate elements between the coupled or associated items absent specific contrary language.

Although the steps of some of the disclosed methods are described in a particular, sequential order for convenient presentation, it should be understood that this manner of description encompasses rearrangement, unless a particular ordering is required by specific language set forth below. For example, steps described sequentially may in some cases be rearranged or performed concurrently. Additionally, the description sometimes uses terms like "produce" and "provide" to describe the disclosed methods. These terms are high-level abstractions of the actual steps that are performed. The actual steps that correspond to these terms will vary depending on the particular implementation and are readily discernible by one of ordinary skill in the art.

Unless explained otherwise, all technical and scientific terms used herein have the same meaning as commonly understood to one of ordinary skill in the art to which this disclosure belongs. Although methods and compounds similar or equivalent to those described herein can be used in the practice or testing of the present disclosure, suitable methods and compounds are described below. The compounds, methods, and examples are illustrative only and not intended to be limiting, unless otherwise indicated. Other features of the disclosure are apparent from the following detailed description and the claims.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that can depend on the desired properties sought and/or limits of detection under standard test conditions/methods. When directly and explicitly distinguishing embodiments from discussed prior art, the embodiment numbers are not approximates unless the word "about" is recited. Furthermore, not all alternatives recited herein are equivalents.

To facilitate review of the various embodiments of the disclosure, the following explanations of specific terms are provided.

Fluidly Coupled: This term is used to describe system components that are connected such that a fluid can flow from one system component to another. In some embodiments, system components need not be directly, physically coupled to one another in order to be fluidly coupled, but instead may be fluidly coupled through a line or pipe that delivers a fluid from one component to another.

Produced Water: Water, typically a brine, that comprises a hydrocarbon species, an organic compound, an inorganic salt species, or any combination thereof and that is the by-product of an oil and/or gas extraction process. In particular embodiments, the produced water is water that is expelled with crude oil during oil and/or gas production or extraction. In particular embodiments, produced water is a complex mixture of various inorganic and organic salts including sodium chloride, sodium sulfate, sodium hydroxide, sodium carbonate, sodium bicarbonate, potassium hydroxide, potassium chloride, calcium chloride, magnesium chloride, magnesium sulfate, lithium chloride, and/or strontium chloride.

Supercritical Water Desalination: A process wherein a hydrothermal, concentrated brine is separated from lower salt content water under conditions where water is supercritical.

Supercritical Water Oxidation: A wet oxidation process that allows for destruction of organic materials present in a feed water by transforming the organic matter into water and carbon dioxide under supercritical conditions.

Supercritical Water: Water that exists at a temperature and pressure that is higher than water's critical point, such as at temperature above 647 K and a pressure greater than 220 bar.

Abbreviations and symbols used herein are explained in the below table.

| Symbol/Abbreviation | Meaning |
|---|---|
| C | cost ($) |
| CAPEX | annualized capital cost ($/y) |
| CF | Capacity factor |
| D | net distillate produced ($m^3$/day) |
| $\dot{E}$ | power (kW) |
| f | contingency and indirect cost factor |
| FCR | Fixed charge rate |
| h | enthalpy (kJ/kg) |
| LCOW | levelized cost of water ($/$m^3$) |
| $\dot{m}$ | mass flowrate (kg/sec) |
| $\dot{P}$ | power generated ($kW_e$) |
| $\dot{q}$ | heat transferred (kW) |
| T | temperature (° C.) |
| $\dot{w}$ | work done per unit time (kW) |
| W | salt weight concentration (%) |
| X | salt concentration (g/L) |
| $\eta$ | efficiency |
| $\rho$ | density |
| EFC | Eutectic freeze crystallization |
| EOS | Equation of state |
| MVC | Mechanical vapor compressor |
| NG | Natural gas |
| $sCO_2$ | Supercritical carbon dioxide |
| SCW | Supercritical water |
| SCWD | Supercritical water desalination |
| SCWO | Supercritical water oxidation |
| ZLD | Zero liquid discharge |

Introduction

Various industries often produce water as a by-product that comprises undesirable contaminants that can be costly to remove due to the amount of water that is produced and the methods and/or system components needed to perform the purification. One example of a prevalent water by-product is produced water, which is a brine that comes out of a reservoir while extracting oil and gas. The produced water can have a high hydrocarbon content, such as up to 120 g/L. Disposal of produced water proves costly due to its volume and composition. Other concerns associated with produced water include drinking water contamination, negative environmental impacts, and methane emissions.

Some of the standard methods used for the treatment of contaminated water include thermal and membrane-based processes. Thermal treatments include multi-effect distillation, mechanical vapor compression, and thermo-vapor compression. In a mechanical vapor compressor (MVC), electricity is used as a heat source to compress the vapor produced by an evaporator. The thermo-vapor compressor uses high-pressure steam to compress the vapor produced by an evaporator. Membrane-based processes include membrane distillation, pervaporation, and forward osmosis. Researchers have also proposed reverse osmosis for contaminated water treatment. Membrane distillation and pervaporation are membrane-based processes that are driven by a temperature difference across the membrane surface. Current treatment methods can help reduce the volume of brine in the contaminated water and increase its salt concentration up to 250 g/L. The resulting hydrothermal concentrated brine still requires proper disposal. In addition, these technologies are often not capable of handling the hydrocarbon load found within produced water, in particular, and therefore require additional treatment for organics removal, which can be expensive and energy-intensive.

A desirable process for purifying contaminated water can include those that result in "zero liquid discharge" (or "ZLD"). In ZLD, the water in the feed stream is entirely recovered, and the salt is rejected as solid waste or as a profitable by-product. The most commonly used technology for ZLD is the brine crystallizer, which works on a principle similar to that of mechanical vapor compressor (MVC); however, brine crystallization is an energy-intensive process with energy consumption in the range of 50-70

$$kWh_e/m^3_{feed}.$$

Another ZLD process is eutectic freeze crystallization (EFC), where the feed water is separated into ice and salt crystals. Supercritical water desalination (SCWD) is a promising alternative ZLD technology. At supercritical conditions (P>221 bar; T>374° C.), the salt solubility in water decreases drastically, allowing the inorganic salts to be separated. In SCWD, heat transfer takes place via sensible heating, while other thermal desalination system utilizes latent heat transfer. SCWD, however, is still an energy-intensive process. Despite efforts to date, the energy consumption for ZLD remains very high, and pre-treatment technologies would still be required to remove the hydrocarbon and organic load present in the feed water before the actual desalination process starts.

Disclosed herein are embodiments of a method and a system that utilizes supercritical water oxidation (SCWO) in combination with supercritical water desalination (SCWD). In particular embodiments, water comprising an organic material is treated using SCWD, which in turn is powered by SCWO of the organic material present in the water. As described herein, integrating these two processes facilitates good system performance and allows by-products produced by the SCWD and/or the SCWO processes to be used up in the method itself, as opposed to creating further by-products and/or wasted energy. The SCWO also helps increase the distillate temperature, which can be reused both for feed pre-heating and power generation. The method and system embodiments of the present disclosure can be utilized with different power cycles and are flexible in terms of the salt concentration and/or organic material that can be present in the water feed. For example, the performance of system embodiments disclosed herein is independent of any salt concentration, both in terms of cost and energy. The disclosed method and system embodiments exhibit reduced costs, reduced energy consumption (e.g., a reduction in net electrical energy requirements to zero), and increased performance as compared to commonly used desalination techniques, including brine concentrator-crystallizer, eutectic freeze crystallization, and standalone SCWD. The disclosed system and method embodiments also are 100% energy efficient compared to commercially used technology and also at least 60% cost efficient compared to commercially used technology. In some embodiments, the disclosed method and system embodiments achieve ZLD by utilizing SCWO in combination with SCWO, which can yield dry and/or solid salts from the feed water. In some other embodiments, the disclosed method and system embodiments do not achieve ZLD but instead yield a brine with salt concentrations near saturation to minimize liquid waste generation.

System Embodiments

Described herein are embodiments of a system for treating a water feed comprising an inorganic salt and/or an organic component to produce purified water. The system comprises system components that facilitate SCWD wherein these system components are coupled with system components that facilitate SCWO. The system is thus an integrated system capable of SCWD and SCWO. In particular embodiments, the system comprises a heater, a heat exchanger, a boiler, a reactor for SCWO, a separator (e.g., a hydrocyclone separator), a flash tank, a pump, a compressor, a turbine, a cooler, and combinations thereof. In particular embodiments, the system can further comprise additional components, such as an evaporator, a pressure exchanger, a capacitive deionization cell, or any combination thereof. The system also can comprise a plurality of an individual component so as to have two or more of any particular component. For example, in some embodiments, the system can comprise two or more feed pre-heating heat exchangers; two or more heat exchangers (e.g., supercritical heat exchangers, compressor heat exchangers, or any combination thereof); two or more pumps (e.g., cooling water pumps, high-pressure pumps, or combinations thereof); two or more flash tanks; and a natural gas heater. Heaters and/or exchangers used in the system (e.g., feed pre-heaters) can be shell and tube-type. In particular embodiments, any supercritical heat exchanger used in the system is typically a hairpin, multi-tube exchanger. In particular embodiments, components of the system that handle feed water and/or salts at/under supercritical conditions typically are made of suitable alloys that can resist corrosion (e.g., Hastelloy C276 and/or Inconel 625). Components that handle distillate produced from the feed water can be made of stainless steel materials. Suitable components that can be used in the system can be selected from those known in the art, particularly with the benefit of the present disclosure.

In some embodiments, the system is an integrated system capable of performing supercritical water oxidation coupled with supercritical water desalination. In some embodiments, the system comprises a feed pump that pressurizes a feed water; a heater and/or a supercritical heat exchanger fluidly coupled to the feed pump to pre-heat the feed water expelled from the feed pump; a boiler that is fluidly coupled to the heater and/or the heat exchanger and that heats the feed water to a temperature sufficient to provide supercritical water; a reactor that is fluidly coupled to the boiler, wherein the reactor comprises an oxidant capable of inducing supercritical water oxidation so as to provide a supercritical water product comprising supercritical water, a gas, a salt, or a combination thereof; and a separator that is fluidly coupled to the reactor, wherein the separator promotes separation of the supercritical water and the gas from the salt, wherein the salt is in the form of a hydrothermal concentrated brine. In some embodiments, the separator is disposed downstream of the reactor and separates a hot supercritical feed into hydrothermal concentrated brine and supercritical water. In some other embodiments, the reactor is disposed downstream of the separator and oxidizes a desalinated distillate. In some embodiments, the system can further comprise a compressor that converts oxygen to the oxidant present in the reactor, wherein the compressor is fluidly coupled to the reactor. In yet additional embodiments, the system can further comprise a power cycle turbine, a power cycle cooler, a power cycle pump, and a power cycle heat exchanger, wherein power cycle the heat exchanger fluidly couples the supercritical heat exchanger to the power cycle turbine, which is fluidly coupled to the power cycle cooler, which in turn is fluidly coupled to the power cycle pump. In such embodiments, the power cycle turbine produces electricity from the supercritical water obtained from the separator. In yet additional embodiments, the system can further comprise a pressure exchanger that is fluidly coupled to the feed pump that pressurizes the feed water; one or more flash tanks that are fluidly coupled to the separator and that produce a dry salt and vapor from the hydrothermal concentrated brine; a vapor feed pre-heater that is fluidly coupled to the one or more flash tanks and that uses the vapor from the one or more flash tanks to heat the feed water; an evaporator that is fluidly coupled to the one or more flash tanks; a salt feed pre-heater that is fluidly coupled to the evaporator; and a cooler that is fluidly coupled to the pressure exchanger. In such embodiments, the feed pump is fluidly coupled to the pressure exchanger and pressurizes the feed water to a higher pressure than that provided by the pressure exchanger, the heater is fluidly coupled to the feed pump to pre-heat the feed water expelled from the feed pump, and the supercritical heat exchanger is fluidly coupled to the heater and heats the feed water to a higher temperature than that provided by the heater. In some such embodiments, the one or more flash tanks comprises a first flash tank and a second flash tank, the first flash tank is fluidly coupled to the separator and produces a first portion of the vapor from the hydrothermal concentrated brine, the second flash tank is fluidly coupled to the first flash tank and produces a second portion of the vapor from the hydrothermal concentrated brine, and the vapor feed pre-heater uses the second portion of the vapor to heat the feed water. In another embodiment, the system can further comprise a recompression Brayton cycle set-up, comprising a supercritical $CO_2$ ($sCO_2$) heater, a $sCO_2$ turbine, a low temperature recuperator, a high temperature recuperator, a $sCO_2$ cooler, a $sCO_2$ compressor, and a $sCO_2$ re-compressor; wherein the system is fluidly coupled to the $sCO_2$ heater. Such embodiments may further comprise a capacitive deionization cell that is fluidly coupled to the pressure exchanger. Embodiments of the disclosed system can be portable or they may be configured to be retrofitted to an existing processing system.

In some embodiments, the system is an integrated system capable of performing supercritical water oxidation coupled with supercritical water desalination to provide both heat energy and water source to an integrated steam methane reforming (SMR) process for hydrogen production. In some embodiments, the system comprises a feed pump that pressurizes a feed water; a heater and/or a supercritical heat exchanger fluidly coupled to the feed pump to pre-heat the feed water expelled from the feed pump; a boiler that is fluidly coupled to the heater and/or the heat exchanger and that heats the feed water to a temperature sufficient to provide supercritical water; a reactor that is fluidly coupled to the boiler, wherein the reactor comprises an oxidant capable of inducing supercritical water oxidation so as to provide a supercritical water product comprising supercritical water, a gas, a salt, or a combination thereof; and a flash tank that is fluidly coupled to the reactor and that produces a purified water vapor that is reacted with a natural gas feed in a SMR reactor.

One exemplary system embodiment is illustrated in FIG. 1. With reference to FIG. 1, system 100 is operated by introducing feed 102 into pump 104, which facilitates pressurizing the feed. In the present disclosure, pump 104 additionally or alternatively may be referred to as a feed pump 104. Pressurized feed is then pre-heated by passing it to feed pre-heater 106 and supercritical heat exchange 108. The partially heated feed is then heated to operating temperature in natural gas boiler 110, which provides a supercritical feed. The supercritical feed is then sent to reactor 112, wherein supercritical water oxidation occurs using compressed oxygen from multi-stage compressor 114, which utilizes inter-stage cooling and facilitates increasing the oxygen pressure. In the present disclosure, compressor 114 additionally or alternatively may be referred to as an oxygen compressor 114. The hot supercritical feed then exits reactor 112 and is sent to separator 116, which separates the hot supercritical feed into hydrothermal concentrated brine and supercritical water. The supercritical water can be used to pre-heat the feed in pre-heater 106 and supercritical heat exchange 108. It also can be used as a heat source for the electricity-generating power cycle shown in FIG. 1. As illustrated in FIG. 1, a power cycle comprising pump 118, condenser 120 (through which a coolant is passed), and turbine 122 can be used in combination with the supercritical water and power cycle heat exchanger 124 to produce electricity. In the present disclosure, pump 118 additionally or alternatively may be referred to as a power cycle pump 118, and/or turbine 122 additionally or alternatively may be referred to as a power cycle turbine 122. The hydrothermal concentrated brine is sent to flash tank 126, which produces vapor that can be used for pre-heating, and dry salts that can be expelled from the system. As further illustrated in FIG. 1, by-products from the supercritical water, e.g., gas and drinking water, can be expelled or isolated from the system. Exemplary operating procedures for system 100 of FIG. 1 are described in Table 1, below. In Table 1, each process is labeled with reference to the numbered system component as labeled in FIG. 1 and discussed above and/or to a process component (e.g., the feed, the SCW, etc.) passing through the system component with the indicated properties.

TABLE 1

| Process | Component | Concentration (g/L) | $Pressure_{in}$ (bar) | $Pressure_{out}$ (bar) | $Temperature_{in}$ (° C.) | $Temperature_{out}$ (° C.) |
|---|---|---|---|---|---|---|
| 102 | Feed | 0-350 | 1 | | 25-50 | |
| 104 | Feed | 0-350 | 1 | 230-375 | 25-50 | |
| 106 | Feed | 0-350 | 230-375 | | 25-50 | 250-350 |
| 106 | SCW | 0-0.7 | 230-375 | | 260-360 | 80-50 |
| 108 | Feed | 0-350 | 230-375 | | 250-350 | 350-550 |
| 108 | SCW | 0-0.7 | 230-375 | | 500-400 | 260-360 |
| 110 | Feed | 0-350 | 230-375 | | 350-550 | 380-500 |
| 112 | Feed | 0-350 | 230-375 | | 380-500 | 400-550 |
| 114 | Oxygen | | 230-375 | | 400-550 | |
| 116 | SCW | 0-0.7 | 230-375 | | 400-550 | |
| 116 | Brine | 400-70 | 230-375 | | 400-550 | |
| 124 | Power cycle HEX | | 50-200 | | 25 | 370 |
| 118 | Power cycle pump | | 0.04-0.1 | 50-200 | 30-45 | |
| 120 | Power cycle condenser | | 0.04-0.1 | | 30-45 | |
| 122 | Power cycle turbine | | 50-200 | 0.04-0.1 | 400-350 | 30-45 |

Additional system embodiments disclosed herein can include a pressure exchanger that increases a pressure of a feed water; a feed pump that is fluidly coupled to the pressure exchanger and that pressurizes the feed water to a higher pressure than that provided by the pressure exchanger; a heater (e.g., a feed preheater) that is fluidly coupled to the feed pump to pre-heat the feed water expelled from the feed pump; a supercritical heat exchanger that is fluidly coupled to the heater and that heats the feed water to an even higher temperature than that provided by the heater; a boiler that is fluidly coupled to the heat exchanger and that heats the feed water to supercritical conditions; a reactor that is fluidly coupled to the boiler, wherein the reactor comprises an oxidant capable of inducing supercritical water oxidation so as to provide a supercritical water product comprising supercritical water, a gas, a salt, or a combination thereof; a separator that is fluidly coupled to the reactor, wherein the separator promotes separation of the supercritical water and the gas from the salt, wherein the salt is in the form of a hydrothermal concentrated brine; a first flash tank that is fluidly coupled to the separator and that produces a vapor from the hydrothermal concentrated brine; a second flash tank that is fluidly coupled to the first flash tank and that produces additional vapor from the hydrothermal concentrated brine; a vapor feed pre-heater that uses the additional vapor from the second flash tank to heat the feed water; an oxygen compressor system that is fluidly coupled to the reactor and that comprises an oxygen compressor and an oxygen compressor system cooler; and an electricity generating system that is fluidly coupled to the supercritical heat exchanger and that comprises a power cycle turbine, a power cycle cooler, and a power cycle pump. In some embodiments, the system comprises an evaporator that is fluidly coupled to the second flash tank and that produces dry salts from the hydrothermal concentrated brine and a salt feed pre-heater that uses heat from the dry salts to heat the feed water.

Figure 2:
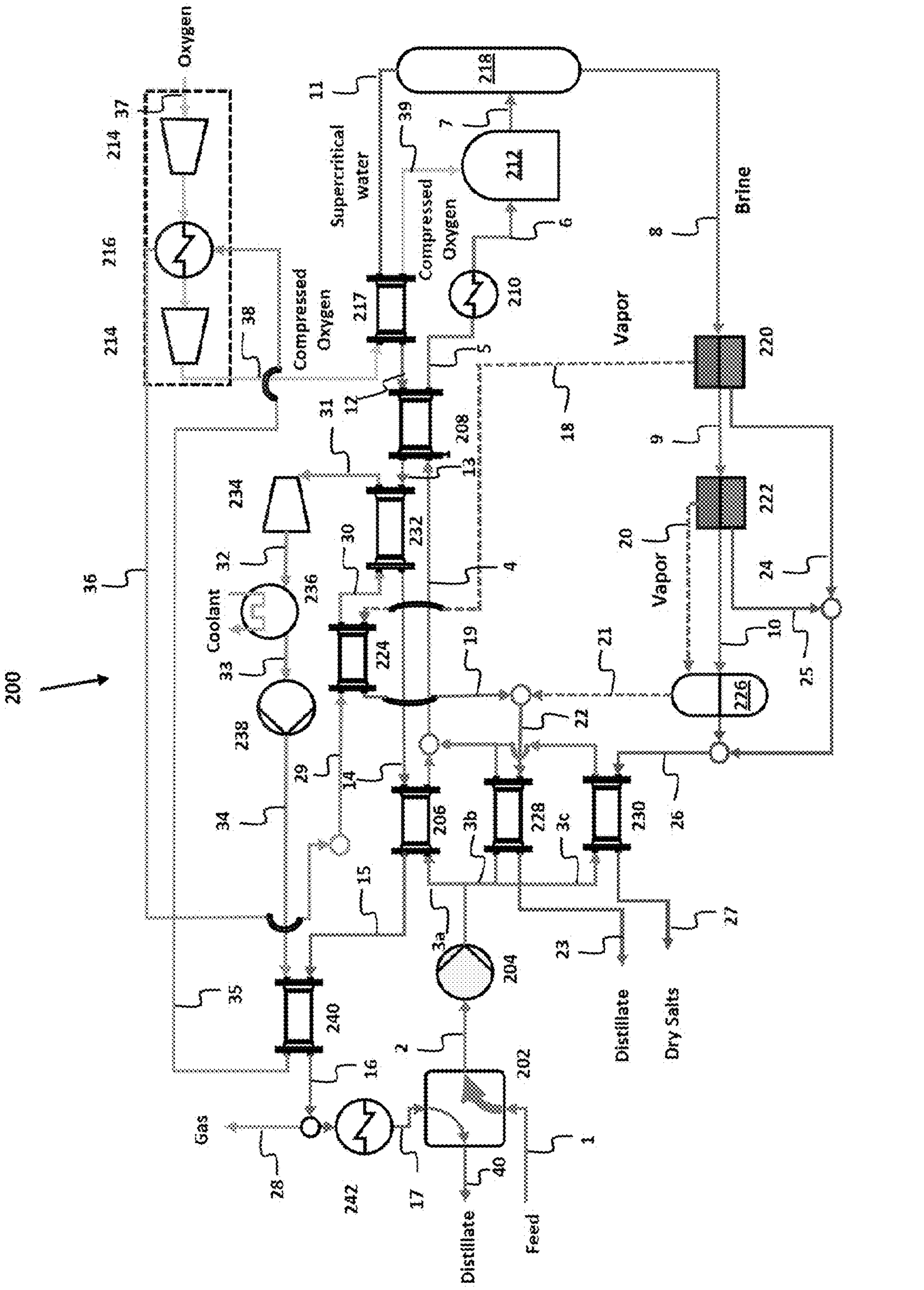
FIG. 2 is a schematic illustrating another exemplary integrated system embodiment for performing SCWO in combination with SCWD.

A representative embodiment of such a system is illustrated in FIG. 2. FIG. 2 shows a representative schematic of system 200, which utilizes a SCWD process integrated with a steam Rankine cycle and a supercritical water oxidation (SCWO) reactor. With reference to FIG. 2, the incoming water feed is first pressurized in pressure exchanger 202 and then by high-pressure pump 204 to 250 bar or to another suitable pressure. In the present disclosure, pump 204 additionally or alternatively may be referred to as a feed pump 204. The pressurized feed is then pre-heated in feed preheater 206 and supercritical heat exchanger 208. The partially heated feed is then heated to the feed operating temperature in natural gas (NG) boiler 210. The now-supercritical feed is then sent to reactor 212, where it undergoes SCWO. Compressed oxygen is supplied to the reactor via multi-stage oxygen compressors 214 with inter-stage cooling provided by cooler 216. In the present disclosure, cooler 216 additionally or alternatively may be referred to as an oxygen compressor system cooler 216. This compression cycle increases the oxygen pressure to 250 bar prior to heating to the feed operating temperature. The compressed oxygen is passed through heat exchanger 217 and then introduced into reactor 212.

As a result of heat generation during SCWO, the feed is effectively heated to an even higher temperature. The hot supercritical feed exiting the reactor is then separated into hydrothermal, highly concentered brine and supercritical water (SCW) using separator 218. The SCW is used to pre-heat the feed by passing it through various heat exchangers included in the system. The brine generated from separator is flashed in a series of flash tanks (flash tanks 220 and 222) to produce dry salts and vapor. The vapor generated from first flash tank 220 is used as a heat source for the power cycle and is passed to heat exchanger 224 included in the power cycle. In the particular embodiment of FIG. 2, evaporator 226 is used for feeds comprising a salt concentration greater than 70 g/L. The vapor produced from second stage flashing in flash tank 222 is used as a heat source for evaporator 226. The vapor generated from the evaporator is also used for feed pre-heating. The heat of dry salt is also recovered for feed pre-heating. Therefore, feed obtained from pump 204 is split into three parts labeled 3*a*, 3*b*, and 3*c* in FIG. 2 that are passed through feed pre-heater 206, vapor feed pre-heater 228, and salt feed pre-heater 230, respectively.

As described above for FIG. 2, SCW leaving supercritical heat exchanger 208 is used as a heat source for the electricity-generating power cycle to enhance energy efficiency. For the steam Rankine cycle illustrated by FIG. 2, the pressurized water gets converted into steam using exchanger 232. The steam flows into turbine 234 to generate electricity and is later cooled in condenser 236 with coolant. The cooled water is then pumped back to the power cycle operating pressure using pump 238. Heat remaining in the distillate is used to pre-heat the power cycle working fluid using heater 240. For combustion of hydrocarbons, oxygen is used, which is compressed in the multi-stage compressor with cooler 216. The heat of cooler 216 is used for pre-heating the power cycle working fluid. Supercritical water can be converted to distillate (e.g., drinking water) via cooler 242.

Exemplary operating procedures for system 200 of FIG. 2 are described in Table 2, below. Processes 1 through 40 in Table 2 are also labeled in FIG. 2. In various embodiments and/or processes, the component (e.g., the feed) may be characterized by an operating pressure of 250 bar and/or a feed flowrate of 5000 $m^3$/day. In some examples, the feed includes and/or is a brine including 100 g/L salt and 10.6 g/L hydrocarbon.

TABLE 2

| Process | Flow (kg/s) | $Pressure_{in}$ (bar) | $Pressure_{out}$ (bar) | $Temperature_{in}$ (° C.) | $Temperature_{out}$ (° C.) |
|---|---|---|---|---|---|
| 1 to 2 | 61.8 | 1 | 178.5 | 25 | 25 |
| 2 to 3a/3b/3c | 61.8 | 178.5 | 250 | 25 | 25 |
| 3a to 4 | 50.9 | 250 | 250 | 25 | 313 |
| 3b to 4 | 7.2 | 250 | 250 | 25 | 313 |
| 3c to 4 | 3.6 | 250 | 250 | 25 | 313 |
| 4 to 5 | 61.8 | 250 | 250 | 313 | 313 |
| 5 to 6 | 61.8 | 250 | 250 | 397.2 | 420 |
| 6 to 7 | 61.8 | 250 | 250 | 420 | 439.7 |
| 7 to 8 | 11.8 | 250 | 2.2 | 439.7 | 439.7 |
| 8 to 9 | 6.6 | 2.2 | 119 | 439.7 | 353 |
| 9 to 10 | 2.7 | 119 | 0.67 | 353 | 132 |
| 7 to 11 | 50.9 | 250 | 250 | 439.7 | 439.7 |
| 11 to 12 | 50.9 | 250 | 250 | 439.7 | 439.1 |
| 12 to 13 | 50.9 | 250 | 250 | 439.1 | 383 |
| 13 to 14 | 50.9 | 250 | 250 | 383 | 324 |
| 14 to 15 | 50.9 | 250 | 250 | 324 | 56.6 |
| 15 to 16 | 50.9 | 250 | 250 | 56.6 | 53 |
| 16 to 17 | 50.9 | 250 | 250 | 53 | 35 |
| 16 to 28 | 1.1 | 250 | 250 | 35 | 35 |
| 17 to 40 | 49.7 | 250 | 1 | 35 | 35 |
| 18 to 19 | 2.2 | 119 | 119 | 353 | 326 |
| 20 | 2.1 | 2.2 | | 132 | 132 |
| 21 | 1.9 | 0.67 | | 95 | 95 |
| 22 to 23 | 6.2 | | | 353 | 35 |
| 24 | 3.0 | | | 353 | |
| 25 | 2.0 | | | 132 | |
| 26 | 0.8 | | | 95 | |
| 26 to 27 | 5.7 | | | 353 | 35 |
| 28 | 1.1 | 250 | 250 | 35 | 35 |
| 29 to 31 | 9.1 | 133.9 | 133.9 | 60 | 373 |
| 31 to 32 | 9.1 | 133.9 | 0.06 | 373 | 35 |
| 32 to 33 | 9.1 | 0.06 | 0.06 | 35 | 35 |
| 33 to 34 | 9.1 | 0.06 | 133.9 | 35 | 35 |
| 34 to 35 | 9.1 | 133.9 | 133.9 | 35 | 51.6 |
| 35 to 36 | 9.1 | 133.9 | 133.9 | 51.6 | 60 |
| 37 to 38 | 0.9 | 1 | 250 | 25 | 220 |
| 38 to 39 | 0.9 | 250 | 250 | 220 | 420 |

In another embodiment, the system can comprise a pressure exchanger that increases the pressure of a feed water; a feed pump that is fluidly coupled to the pressure exchanger and that pressurizes the feed water to a higher pressure than that provided by the pressure exchanger; a heater (e.g., a feed preheater) that is fluidly coupled to the feed pump to pre-heat the feed water expelled from the feed pump; a supercritical heat exchanger that is fluidly coupled to the heater and that heats the feed water to a higher temperature than that provided by the heater; a boiler that is fluidly coupled to the heat exchanger and that heats the feed water to supercritical conditions; a reactor that is fluidly coupled to the boiler, wherein the reactor comprises an oxidant capable of inducing supercritical water oxidation so as to provide a supercritical water product comprising supercritical water, a gas, a salt, or a combination thereof; a separator that is fluidly coupled to the reactor, wherein the separator promotes separation of the supercritical water and the gas from the salt, wherein the salt is in the form of a hydrothermal concentrated brine; a first flash tank that is fluidly coupled to the separator and that produces a vapor from the hydrothermal concentrated brine; a second flash tank that is fluidly coupled to the first flash tank and that produces additional vapor from the hydrothermal concentrated brine; e; a vapor feed pre-heater that uses the additional vapor from the second flash tank to heat the feed water; r; an oxygen compressor system that is fluidly coupled to the reactor and that comprises an oxygen compressor and an oxygen compressor system cooler; an electricity generating system that is fluidly coupled to the supercritical heat exchanger and that comprises a power cycle turbine, a power cycle cooler, and a power cycle pump; a recompression Brayton cycle set-up, comprising a $sCO_2$ heater, a $sCO_2$ turbine, a low temperature recuperator, a high temperature recuperator, a $sCO_2$ cooler, a $sCO_2$ compressor, and a $sCO_2$ re-compressor; wherein the separator is fluidly coupled to the $sCO_2$ heater; and a capacitive deionization cell that is fluidly coupled to the pressure exchanger. In some embodiments, the system comprises an evaporator that is fluidly coupled to the second flash tank and that produces dry salts from the hydrothermal concentrated brine and a salt feed pre-heater that uses heat from the dry salts to heat the feed water.

Figure 3:
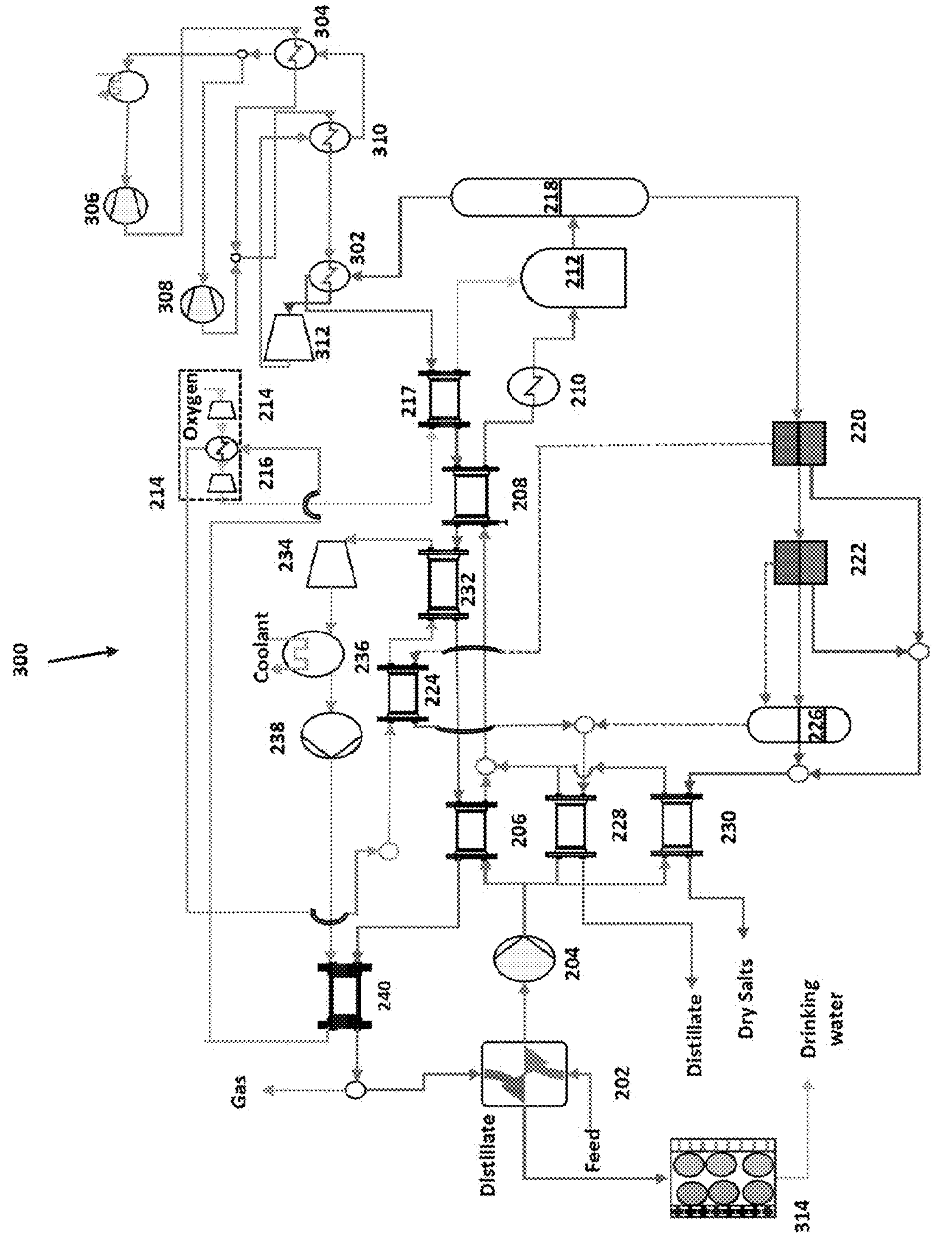
FIG. 3 is a schematic illustrating an exemplary system embodiment for performing SCWO in combination with SCWD using a fluidly coupled recompression Brayton cycle and capacitive deionization cell.

An exemplary such system embodiment is illustrated in FIG. 3. FIG. 3 shows a representative schematic of a system embodiment 300 that facilitates treating water having a concentration of an organic material (e.g., a hydrocarbon concentration) that is greater than >30 g/L. In embodiments where the concentration of organic material in the water is this high, the net energy supplied by the SCWO is high enough to make the system self-sustaining and no external heating, for example, through a natural gas boiler is required. As such, the SCW temperature is high enough to run an additional power cycle. For example, as illustrated in FIG. 3, system 300 can comprise similar components to those illustrated in FIG. 2, but can be modified to include a supercritical carbon dioxide ($sCO_2$) recompression Brayton cycle. In system 300, hot SCW can be used as a heat source for the $sCO_2$ recompression Brayton cycle, where it will cool down. In particular, hot SCW from separator 218 can be passed through heater 302 and then to supercritical heat exchanger 217 where it acts as a heat source for the feed. To enhance the heat integration and avoid a pinch point, $sCO_2$ leaving low temperature recuperator 304 is divided into two streams processes. The first stream flows into main compressor 306 and is heated with low temperature recuperator 304. The second stream flows in re-compressor 308 and is mixed with the first stream. The mixed stream is then heated in high temperature recuperator 310 and to its maximum temperature (e.g., 540° C.) with the help of SCW in heater 302. The heated $sCO_2$ flows into turbine 312 to deliver work. The hot $sCO_2$ leaving the turbine acts as a heat source for high temperature recuperator 310 and low temperature recuperator 304. In some embodiments, capacitive deionization cell 314 can be used (e.g., see FIG. 3) to purify the distillate to thereby meet drinking water standards of, for example, 500 mg/L. In the present disclosure, compressor 306 additionally or alternatively may be referred to as a $sCO_2$ compressor 306, and/or re-compressor 308 additionally or alternatively may be referred to as a $sCO_2$ re-compressor 308.

While the aforementioned exemplary system embodiments generally correspond to examples in which the systems produce dry salts as a byproduct, this is not required of all embodiments according to the present disclosure. For example, and as discussed in more detail below with respect to Examples 12 and 14, various system embodiments may yield a concentrated brine, such as a brine with salt concentrations near saturation to minimize liquid waste generation.

In particular embodiments, the performance of the system improves with increasing hydrocarbon content in the feed. For example, the net energy requirement can range from, for example, 18 to −60 $kWh_e/m^3_{feed}$ as the hydrocarbon content is increased from, for example, 0 g/L to 53 g/L, wherein a negative energy requirement signifies that the system constitutes a net positive energy generation system. In some embodiments, the system is capable of a net energy requirement ranging from 18 to 0 $kWh_e/m^3_{feed}$, such as 10 to 0 $kWh_e/m^3_{feed}$, or 8 to 0 $kWh_e/m^3_{feed}$, or 5 to 0 $kWh_e/m^3_{feed}$ for embodiments wherein the feed has a hydrocarbon concentration ranging from greater than 0 g/L to 10 g/L, such as 1 g/L to 10 g/L, or 5 g/L to 10 g/L. In some embodiments, the system is capable of a net energy requirement of about zero for a feed comprising a hydrocarbon concentration of 10 g/L. In yet some further embodiments, the system can be a net power generating system using feeds having a hydrocarbon concentration above 10 g/L, such as 11 g/L to 70 g/L, or 11 g/L to 50 g/L. In some such embodiments, the net energy requirement can range from zero to −80 $kWh_e/m^3_{feed}$, such as zero to −60 $kWh_e/m^3_{feed}$, or zero to −40 $kWh_e/m^3_{feed}$.

Method Embodiments

Figure 4A:
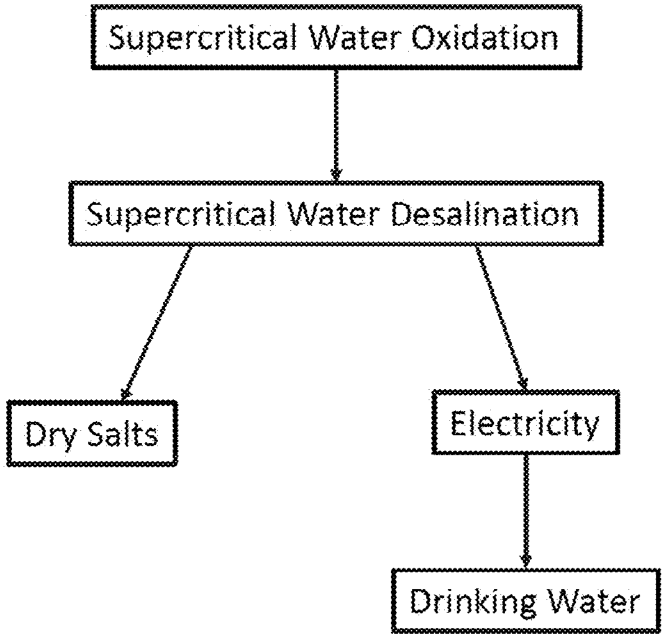
FIGS. 4A and 4B illustrate representative method embodiments as a flow chart (FIG. 4A) and an illustrative schematic (FIG. 4B).
Figure 4B:
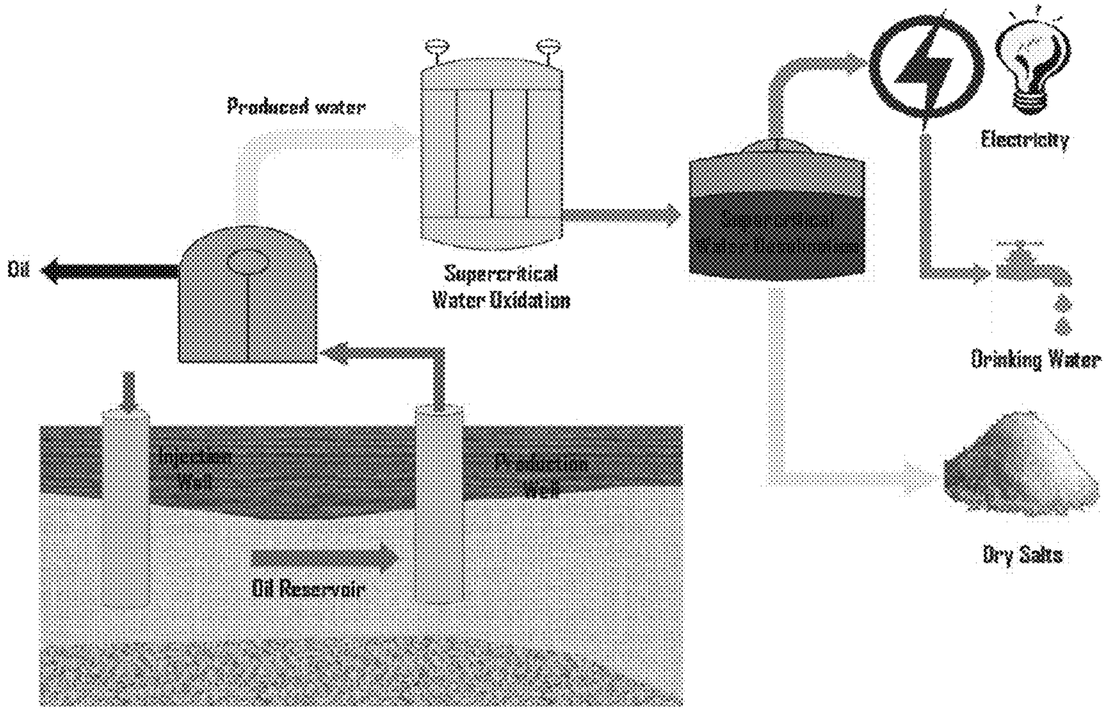

Disclosed herein are method embodiments for obtaining purified water from a water feed that comprises inorganic impurities and/or organic materials. In particular embodiments, the method comprises performing supercritical water desalination in combination with supercritical water oxidation. By combining these techniques, zero liquid discharge can be achieved, along with the ability to produce electricity and purified water (e.g., drinking water) as by-products, such as is illustrated in FIG. 4.

The method can comprise introducing a feed into a system embodiment described herein, wherein the feed is water that comprises contaminants, such as inorganic and/or organic materials. Such inorganic materials can include salts, such as NaCl, and other chloride, sulfate, and/or carbonate salts of magnesium, calcium, potassium, copper, lithium, and the like, which are found in the feed at levels/concentrations that are too high for safe consumption and/or agricultural/industrial use. Organic materials can include organic compounds, such as acetic acid and/or hydrocarbons (e.g., pentane, benzene, toluene, hexane, pyrene, and the like). The oxidant used in the system can be any oxidant capable of oxidizing organic material present in the feed water. In some embodiments, the oxidant can be oxygen, air, and/or hydrogen peroxide.

In particular embodiments, the method comprises pressurizing and heating a feed water to produce supercritical feed; exposing the supercritical water to an oxidant in a reactor to promote supercritical water oxidation and to provide a supercritical water product comprising a salt, a gas, or a combination thereof; performing supercritical water desalination by separating the salt from the supercritical water product using a separator, wherein the salt is in the form of a hydrothermal concentrated brine; using a portion of the supercritical water product obtained from the separator to pre-heat the feed water; producing vapor from the hydrothermal concentrated brine; using the vapor as a heat source for a power cycle, an evaporator, a heater that pre-heats the feed water, or any combination thereof; and isolating a distillate from a portion of the supercritical water product obtained from the separator. The supercritical water oxidation and the supercritical water desalination take place in an integrated system.

In some embodiments, the feed water comprises a salt and/or an organic material. In particular embodiments, the feed water comprises both a salt and an organic material.

In some embodiments, the method comprises producing a dry salt from the hydrothermal concentrated brine, and/or the method can serve as a zero liquid discharge method that converts all of the hydrothermal concentrated brine generated from the feed water into the dry salt such that no hydrothermal concentrated brine is expelled from the system. The method also can be used to generate electricity from the components and/or materials utilized/introduced into the system.

Purified water also can be produced and thus the method provides a means for producing drinking water from otherwise contaminated water that is not safe/suitable for consumption. In particular embodiments, the method is used to purify produced water.

In some other embodiments, a method comprises pressurizing and heating a feed water to produce supercritical water; exposing the supercritical water to an oxidant in a reactor to promote supercritical water oxidation and to produce a supercritical distillate and a brine; flashing the supercritical distillate in a flash tank to generate a salt-free vapor stream; reacting the salt-free vapor stream with natural gas in a steam methane reforming (SMR) reactor to produce a syngas, wherein the SMR reactor produces a hot flue gas; purifying the syngas into high-purity hydrogen gas with a water-gas shift reactor and a pressure swing adsorption unit; and sequestering carbon dioxide from the hot flue gas, wherein the pressurizing and heating the feed water includes heating the feed water with the hot flue gas.

The methods can be used with the various system embodiments disclosed herein.

Exemplary parameters for operating a system embodiment according to the present disclosure are described herein; however, such parameters can be modified depending on the feed water used in the system, the materials that are or might be present in the feed water, and/or the desired output of the system. In particular embodiments, the method uses a temperature and pressure sufficient to provide supercritical water from the feed water. In such embodiments, the temperature can be a temperature above 647 K and the pressure can be a pressure greater than 220 bar.

Overview of Several Embodiments

Disclosed herein are embodiments of a system, comprising: a feed pump that pressurizes a feed water; a heater and/or a supercritical heat exchanger that is fluidly coupled to the feed pump to pre-heat the feed water expelled from the feed pump; a boiler that is fluidly coupled to the heater and/or the heat exchanger and that heats the feed water to provide supercritical water; a reactor that is fluidly coupled to the boiler, wherein the reactor comprises an oxidant capable of inducing supercritical water oxidation so as to provide a supercritical water product comprising supercritical water, a gas, a salt, or a combination thereof; and a separator that is fluidly coupled to the reactor, wherein the separator promotes separation of the supercritical water and the gas from the salt, wherein the salt is in the form of a hydrothermal concentrated brine.

In some embodiments, the system further comprises a compressor that converts oxygen to the oxidant present in the reactor, wherein the compressor is fluidly coupled to the reactor.

In any or all of the above embodiments, the oxidant is compressed oxygen.

In any or all of the above embodiments, the system further comprises a turbine, a cooler, a pump, and a heat exchanger, wherein the heat exchanger fluidly couples the supercritical heat exchanger to the turbine, which is fluidly coupled to the cooler, which in turn is fluidly coupled to the pump.

In any or all of the above embodiments, the turbine produces electricity from the supercritical water obtained from the separator.

In any or all of the above embodiments, the system further comprises a pressure exchanger that is fluidly coupled to the feed pump that pressurizes the feed water; one or more flash tanks that are fluidly coupled to the separator and that produces a dry salt and vapor from the hydrothermal concentrated brine; a vapor feed pre-heater that is fluidly coupled to the one or more flash tanks and that uses the vapor from the one or more flash tanks to heat the feed water; an evaporator that is fluidly coupled to the one or more flash tanks; a salt feed pre-heater that is fluidly coupled to the evaporator; and a cooler that is fluidly coupled to the pressure exchanger. In such embodiments, the feed pump is fluidly coupled to the pressure exchanger and pressurizes the feed water to a higher pressure than that provided by the pressure exchanger, the heater is fluidly coupled to the feed pump to pre-heat the feed water expelled from the feed pump, and the supercritical heat exchanger is fluidly coupled to the heater and heats the feed water to a higher temperature than that provided by the heater.

In any or all of the above embodiments, the one or more flash tanks comprises a first flash tank and a second flash tank, the first flash tank is fluidly coupled to the separator and produces a first portion of the vapor from the hydrothermal concentrated brine, the second flash tank is fluidly coupled to the first flash tank and produces a second portion of the vapor from the hydrothermal concentrated brine, and the vapor feed pre-heater uses the second portion of the vapor to heat the feed water.

In any or all of the above embodiments, the system further comprises a recompression Brayton cycle set-up, comprising a supercritical $CO_2$ ($sCO_2$) heater, a $sCO_2$ turbine, a low temperature recuperator, a high temperature recuperator, a $sCO_2$ cooler, a $sCO_2$ compressor, and a $sCO_2$ re-compressor; wherein the system is fluidly coupled to the $sCO_2$ heater.

In any or all of the above embodiments, the system further comprises a capacitive deionization cell that is fluidly coupled to the pressure exchanger.

In any or all of the above embodiments, the system is a portable system.

In any or all of the above embodiments, the system is configured to be retrofitted to an existing processing system.

In any or all of the above embodiments, the system is capable of a net energy requirement of about zero for hydrocarbon concentration of 10 g/L and is a net power generating system for higher hydrocarbon concentration.

In any or all of the above embodiments, the performance of the system is independent of salt concentration.

In any or all of the above embodiments, the evaporator produces dry salts from the hydrothermal concentrated brine; and the salt feed pre-heater uses heat from the dry salts to heat the feed water.

Also disclosed herein are embodiments of a method, comprising: pressurizing and heating a feed water to produce supercritical water; exposing the supercritical water to an oxidant in a reactor to promote supercritical water oxidation and to provide a supercritical water product comprising a salt, a gas, or a combination thereof; performing supercritical water desalination by separating the salt from the supercritical water product using a separator, wherein the salt is in the form of a hydrothermal concentrated brine; using a portion of the supercritical water product obtained from the separator to pre-heat the feed water; producing vapor from the hydrothermal concentrated brine; using the vapor as a heat source for a power cycle, an evaporator, a heater that pre-heats the feed water, or any combination thereof; and isolating a distillate from a portion of the supercritical water product obtained from the separator.

In any or all of the above embodiments, the supercritical water oxidation and the supercritical water desalination take place in an integrated system.

In any or all of the above embodiments, the feed water comprises a salt and/or an organic material.

In any or all of the above embodiments, the method comprises producing a dry salt from thy hydrothermal concentrated brine, and the method is a zero liquid discharge method that converts all of the hydrothermal concentrated brine into the dry salt.

In any or all of the above embodiments, the method produces electricity and/or wherein the distillate has drinking water quality.

In any or all of the above embodiments, the method is performed using the system of any of the above embodiments.

Also disclosed herein are embodiments of a method, comprising: pressurizing and heating a feed water to produce supercritical water; exposing the supercritical water to an oxidant in a reactor to promote supercritical water oxidation and to produce a supercritical distillate and a brine; flashing the supercritical distillate in a flash tank to generate a salt-free vapor stream; reacting the salt-free vapor stream with natural gas in a steam methane reforming (SMR) reactor to produce a syngas, wherein the SMR reactor produces a hot flue gas; purifying the syngas into high-purity hydrogen gas with a water-gas shift reactor and a pressure swing adsorption unit; and sequestering carbon dioxide from the hot flue gas, wherein the pressurizing and heating the feed water includes heating the feed water with the hot flue gas.

WORKING EXAMPLES

Example 1

In this example, modeling was used to compare the performance of an embodiment of the system and method described herein using combined SCWD and SCWO with different conventional methods for treating water using ZLD, including a brine concentrator/crystallizer desalination process, eutectic freeze crystallization (EFC). Results were also compared against standalone SCWD. In a brine concentrator-crystallizer system, a brine concentrator is used to increase the concentration up to 200 g/L, while the crystallizer is used to produce dry salt crystals. The brine concentrator-crystallizer uses mechanical vapor compressor to increase its energy efficiency. EFC is another alternative for ZLD. In EFC the feed is cooled to the eutectic point where the water gets frozen and the solids salt can be separated.

Figure 5A:
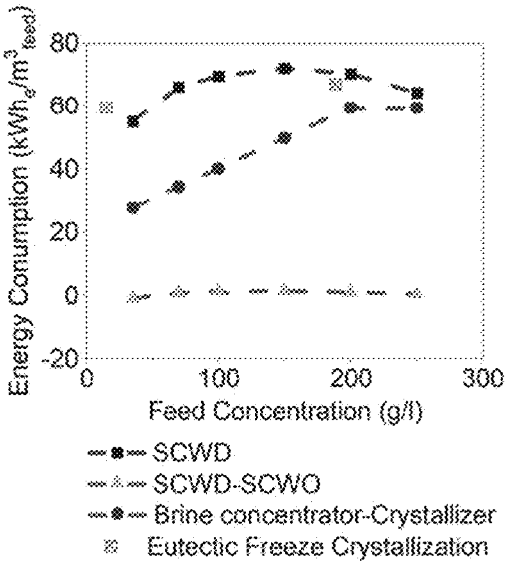
FIGS. 5A and 5B are graphs showing energy consumption (FIG. 5A) and levelized cost of water (FIG. 5B) results from comparing modeling of (i) a disclosed system/method utilizing SCWD coupled with SCWO with (ii) a brine concentrator-crystallizer, and (iii) standalone SCWD, wherein the feed hydrocarbon content is fixed at 10.6 g/L.
Figure 5B:
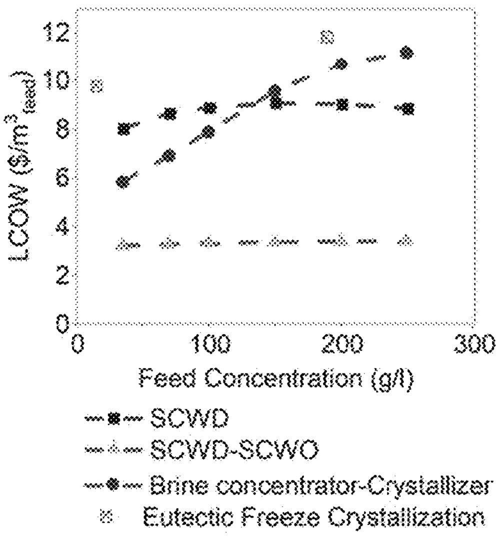

For organics removal the actively used methods include adsorption on activated carbon and walnut shells, air stripping, membrane based process and biological treatment. These processes are expensive with organic removal cost amounting to 0.05 to 1.5 $\$/m^3_{feed}$. For comparison with SCWD-SCWO, the organic removal cost of 1 $\$/m^3_{feed}$ is assumed. Due to the energy released during SCWO, the energy consumption for SCWD-SCWO is much lower compared to standalone SCWD, and a brine concentrator-crystallizer. For feed salt concentration in range of 35 to 250 mg/L salt concentration, the SCWD-SCWO is around 100% more energy-efficient than these processes (see FIG. 5A). Similarly, the LCOW of water for SCWD-SCWO is around 50%, 60%, and 70% less expensive than other technologies for 3.5 g/L, 10 g/L, and 250 g/L salt concentration (see FIG. 5B). The other interesting trend observed for SCWD-SCWO is the treatment cost is independent of the brine concentration, while for other technology, the LCOW increases with concentration.

Example 2

Figure 6A:
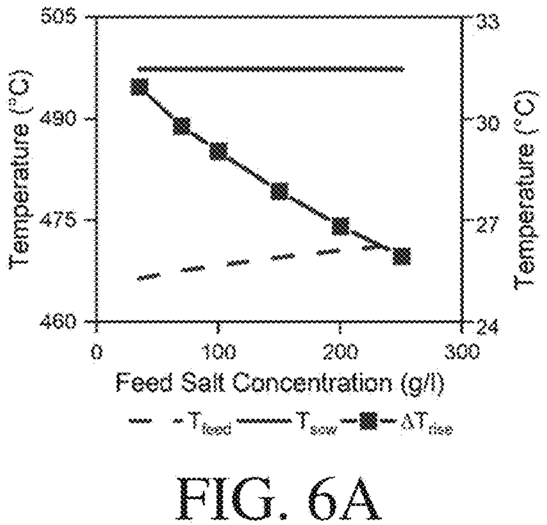
FIGS. 6A-6C are graphs showing the effect of feed salt concentration on SCWD performance as a function of (i) feed temperature and rise in oxidation temperature (FIG. 6A); (ii) thermal and electrical energy requirement and LCOW for treatment of produced water (FIG. 6B); and (iii) power delivered and cycle efficiency (FIG. 6C); wherein the modeling included fixing the feed hydrocarbon content at 10.6 g/L, and using an operating pressure of 325 bar for all feed salt concentrations.

In this example, different salt concentrations were evaluated using modeling based on the disclosed combined SCWO-SCWD process. The salt content of produced water significantly varies depending on the geospatial location; therefore, this example evaluated salt concentration varying from 35 to 250 g/L while keeping the hydrocarbon content at 10.6 g/L. The optimal operating pressure for all feed salt concentration is calculated as 325 bar, resulting in a constant SCW temperature of 497.4° C. As the feed salt concentration is increased, the pinch temperature also increases due to increase in separation temperature. Since the heat capacity is the highest near separation temperature, the net effect is reduction in temperature rise due to SCWO from 31° C. to 26° C., as the feed salt concentration increased from 35-250 g/L (see FIG. 6A).

Figure 6B:
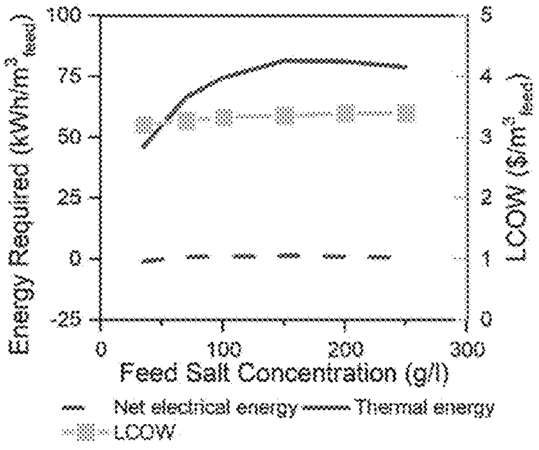
Figure 6C:
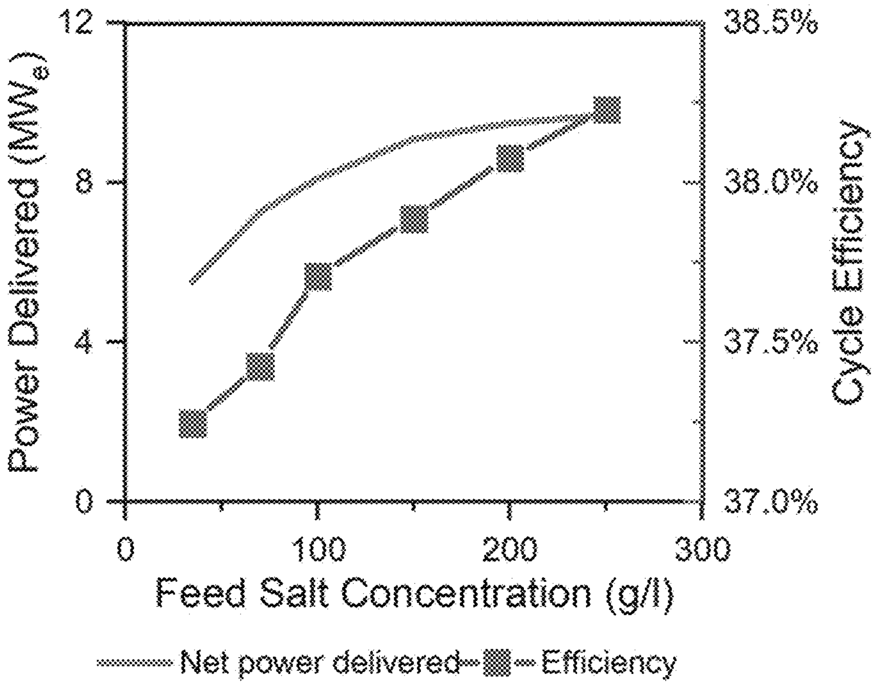

Due to smaller increase in the SCW temperature with higher concentration, the thermal energy requirement for the feed increases (see FIG. 6B). The enthalpy of the saline feed is lower at higher salt concentrations, which helps in extracting more heat from SCW and flash vapor for the power cycle. As a result, the power cycle efficiency increases from 37.2 to 38.2% for 35 to 250 g/L salt feed salt concentration, and power generation also improves (see FIG. 6C). With higher feed salt concentration the thermal energy requirement increases while power generation also increases, resulting to a net zero electrical energy requirement. Similarly, the LCOW remains almost constant at 3.2 $\$/m^3_{feed}$ for all feed salt concentration (see FIG. 6C). Therefore, the performance of integrated SCWD-SCWO system is largely independent of feed salt concentration.

Example 3

Figure 7:
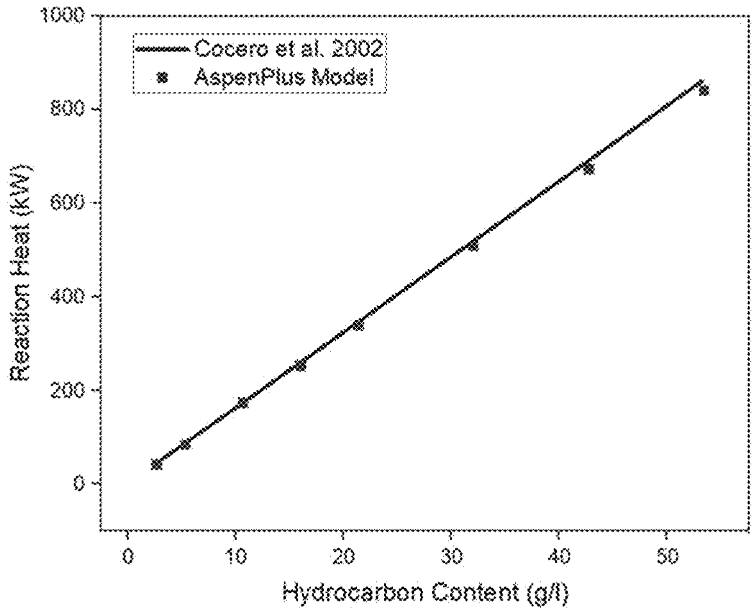
FIG. 7 is a graph showing modeling results from a comparison between the heat of reaction obtained from the AspenPlus plug flow reactor model and the Cocero correlation for hydrocarbon oxidation, wherein the total hydrocarbon content was varied proportionally and a feed flowrate of 1 kg/s was used with the operating pressure and temperature fixed at 250 bar and 400° C., respectively.
Figure 8A:
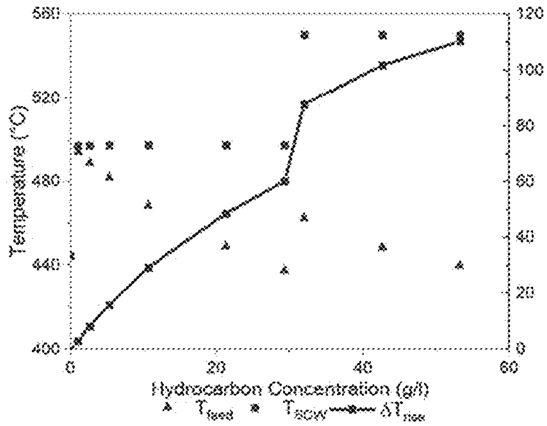
FIGS. 8A-8D are graphs showing results from modeling the effect of hydrocarbon concentration on SCWD-SCWO performance as a function of (i) feed temperature, with SCW temperature leaving the reactor and temperature rise due to SCWO (FIG. 8A); (ii) power cycle thermal efficiency and compressor power (FIG. 8B); (iii) thermal and net electrical energy, and LCOW for produced water treatment (FIG. 8C); and (iv) thermal to electrical power conversion efficiency and power generated (FIG. 8D), including a modified composite curve profile for SCWD-SCWO with heat extraction for the power cycle; wherein the heat available at temperature 380° C. is used for running the re-heat Rankine cycle, while the heat available at 540° C. is used for $sCO_2$ recompression Brayton cycle; the feed salt concentration is 100 g/L, while the operating pressure is held at (a) 250 bar for no hydrocarbon content, (b) 325 bar for 1-30 g/L hydrocarbon content, and (c) 375 bar for 30-53 g/L hydrocarbon content; and, for FIG. 8D, the hydrocarbon content is 53 g/L and the minimum pinch temperature is fixed at 10° C.

With an increase in net hydrocarbon content from 0 to 53 g/L, the energy released due to SCWO increases proportionally (see FIG. 7), and this will result in higher temperature rise. To avoid salt solid precipitation, the temperature and operating pressure can be selected optimally. For feed with no hydrocarbon content, the pressure is kept at 250 bar and 444° C. (see FIG. 8A). With increase in hydrocarbon content to 30 g/L the operating pressure is increased to 325 bar, while the maximum oxidation temperature is fixed at 497° C. The temperature rise due to oxidation increases from 3 to 60° C., as the hydrocarbon concentration is increased from 1 to 30 g/L (see FIG. 8A). It is noteworthy that the temperature increase is not linear, as the heat capacity for the feed increases near the separation point. For hydrocarbon content >30 g/L, the operating pressure is increased to 375 MPa. Temperature rise of 110° C. is observed for 53 g/L hydrocarbon.

Figure 8B:
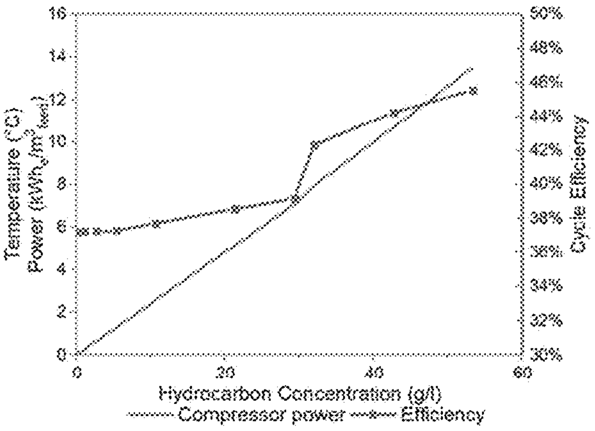

With increase in the hydrocarbon content, the oxygen requirement increases and the net compressor energy requirement increases to 13.5 $kWh_e/m^3_{feed}$. This improves the steam cycle feed pre-heating and the net energy efficiency for the cycle improves from 37.2 to 39%, for hydrocarbon concentration in the range of 0 to 30 g/L (see FIG. 8B). Because of increase in the temperature rise due to SCWO, the net thermal energy requirement for the system reduces from 161 to 0 $kWh_{th}/m^3_{feed}$, for 0 to 30 g/L hydrocarbon (see FIG. 8C).

For hydrocarbon content >30 g/L, the heat available from the SCW is higher than the net energy required for heating the feed to supercritical conditions. This helps in reducing the external heat duty requirement to zero. The composite curve for 53 g/L hydrocarbon is shown in FIG. 8D. The excess heat available (115 $kWh_{th}/m^3_{feed}$) is used to run the $sCO_2$ recompression cycle at a temperature of 540° C., which can achieve an efficiency of 47%. A schematic and working of the high hydrocarbon feed (>30 g/L) is illustrated in FIG. 3.

With a high-quality heat available for the case of hydrocarbon content>30 g/L, the $sCO_2$ recompression cycle can be used for power generation. This results in a sudden increase in the cycle efficiency 40 to 45% for 30 to 53 g/L hydrocarbon (see FIG. 8B). Due to increase in the cycle efficiency the net power generation from the system increases and the net electrical energy requirement reduces from 18.4 to −67.5 $kWh_e/m^3_{feed}$ (see FIG. 8C). A negative electrical energy requirement signifies that the process is then a net power generating system.

Figure 8C:
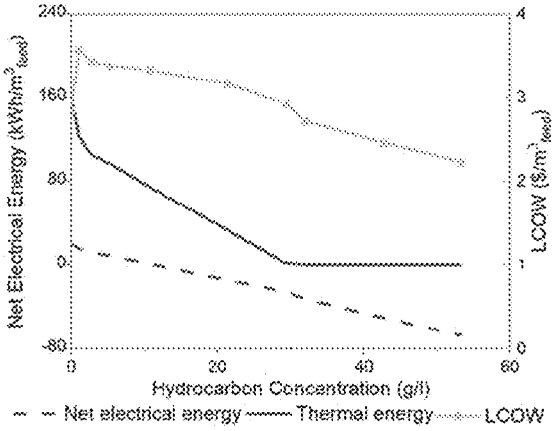
Figure 8D:
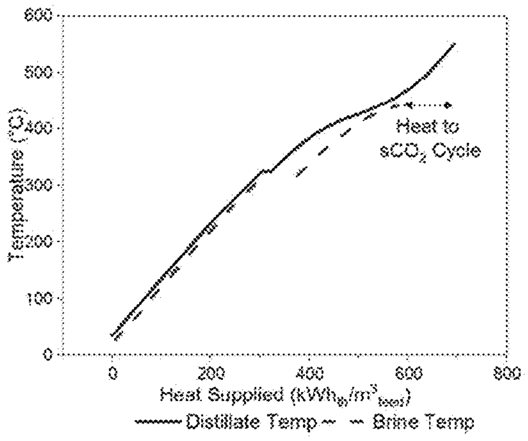

Due to increased cycle efficiency and power generation, the LCOW gradually decreases from 3.6 to 2.2 $\$/m^3_{feed}$ for 1 to 53 g/L hydrocarbon (see FIG. 8C). Another interesting result to note is the lower energy requirement, (less than 20 $kWh_e/m^3_{feed}$) for feed without organics or with very little organic content. Due to energy generation and no reactor requirement, the LCOW for the no organics case is only 2.8 $\$/m^3_{feed}$. This example establishes that the disclosed system and method embodiments can even be used to treat water having low organic material content.

Example 4

Figure 9A:
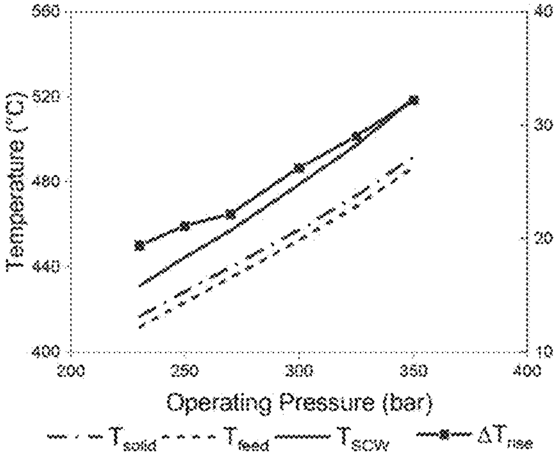
FIGS. 9A and 9B are graphs showing results from modeling the effect of increase in system pressure on (i) NaCl solid phase separation, operating feed temperature and increase in operating temperature (FIG. 9A); and (ii) thermal and equivalent energy requirement and LCOW for treating the produced water (FIG. 9B), wherein the hydrocarbon and salt concentration are fixed at 10.6 and 100 g/L.
Figure 9B:
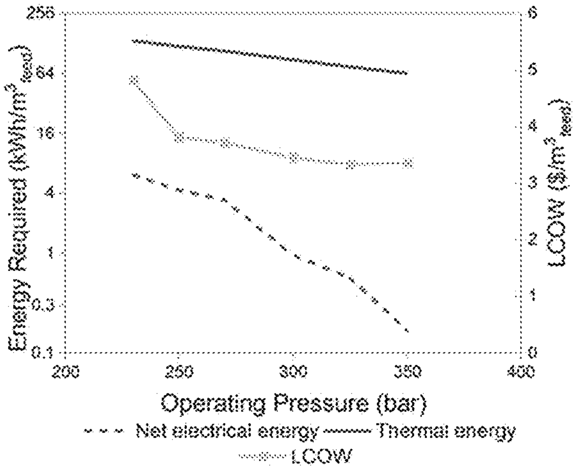

In this example, operating pressure of a system embodiment was modeled. For an operating temperature greater than 449.4° C. at 250 bar pressure, the feed gets separated into vapor and solid. Solid settling-out in the separator and the reactor can make the system difficult to operate. To increase the feed temperature with solid phase separation, the operating pressure needs to be increased. To avoid salt crystallization in the separator and reactor, the maximum allowable temperature after oxidation is assumed to be 5° C. lower than crystallization temperature, and accordingly the feed operating temperature is calculated. As the operating pressure is increased from 230-350 bar, the feed operating temperature increases from 411.8° C. to 487.7° C. (see FIG. 9A). For temperature close to supercritical condition, the heat capacity for the feed is higher, resulting in lower increase in the feed temperature due to SCWO. As the feed pressure is increased from 230-350 bar, the rise in the feed temperature due to SCWO increases from 19.4° C. to 32.2° C. (see FIG. 9B). Higher rise in feed operating temperature helps in reducing the thermal energy requirement from 135.4 to 64 $kWh_{th}/m^3_{feed}$, and the equivalent electrical energy requirement reduces from 6 to 0.2 $kWh_e/m^3_{feed}$.

Reduction in thermal energy requirement helps in reducing the boiler size. Additionally due to an increase in operating temperature, the reaction kinetics improve and the reactor volume also decrease, leading to reduced cost. The LCOW reduces from 4.8 to 3.5 $\$/m^3_{feed}$, as the feed pressure is increased from 230-350 bar. However, the benefit achieved due to reduced thermal energy and increase temperature rise is diminished by the increase in cost of higher pressure system. The net effect is a local minimum treatment cost of 3.3 $\$/m^3_{feed}$ at 325 bar pressure.

It may be noted with increase in the operating pressure from 230 to 350 bar, the salt concentration in distillate will increase from 300 mg/L to 834 mg/L. The limit for safe drinking water is 500 mg/L. Any of the established brackish water desalination technologies can be used for treating the distillate since salt concentration is very low. Here, capacitive deionization (CDI) is used to bring down the distillate salt concentration to 500 mg/L. With CDI the LCOW for SCWD-SCWO increases only by 0.05 $\$/m^3_{feed}$. The schematic for such a case is shown in FIG. 3.

Example 5

In this example, a SCWO process of the combined SCWO-SCWD was modeled. With reference to SCWO, oxygen supplied to the SCWO is first compressed in an inter-stage cooled compressor. While compressing oxygen, the temperature is not allowed to exceed 220° C. Once the oxygen reaches 220° C., it is cooled in a heat exchanger prior to additional compression. The net compression duty ($\dot{w}_{com,O_2}$) is given as:

$$\dot{w}_{com,O_2} = \dot{m}_{O_2} \frac{h_{b,isen} - h_a}{\eta_{isen,com}} \tag{1}$$

Here, $\dot{m}_{O_2}$ is the oxygen mass flowrate, $h_{b,isen}$ is the enthalpy assuming isentropic compression from the state a to b, and $\eta_{isen,com}$ is the compressor's isentropic efficiency. The heat released while cooling the compressor is used for pre-heating the working fluid in the power cycle, enhancing the overall energy efficiency. Pressurized oxygen is then heated to the feed operating temperature with the help of SCW water in the SCW heater (see FIG. 2).

The SCWO reactor simulation was carried out using the Aspen Plus® simulation software produced by Aspen Technology Inc. of Bedford, Massachusetts, to determine the heat of reaction. The reactor employs the plug flow reactor model. The simulation results were validated with the heat of reaction correlation proposed by Cocero et al. for hydrocarbons in "Supercritical water oxidation process under energetically self-sufficient operation," Journal of Supercritical Fluids, Vol. 24 (2002) 37-46 (hereinafter "Cocero et al."). The Cocero et al. correlation predicted the heat of reaction with maximum error of 6% when compared to experimental results. The heat of reaction calculated using Aspen Plus® was within 2% when compared to Cocero et al.

The PR-BM (Peng Robinson-Boston Mathias) is a commonly used equation of state (EOS) model for SCWO. Aspen Plus® also provides the electrolyte nonrandom two-liquid (eNRTL) EOS for calculating electrolyte properties. To calculate the enthalpy a comparison is made between different EOS including PR-BM, eNRTL, the EOS proposed by T. Driesner and C. A. Heinrich in "The system H2O—NaCl. Part I: Correlation formulae for phase relations in temperature-pressure-composition space from 0 to 1000° C., 0 to 5000 bar, and 0 to 1 XNaCl," Geochim. Cosmochim. Acta. 71 (2007) 4880-4901 (hereinafter "Driesner"), and the EOS proposed by A. Anderko and K. S. Pitzer in "Phase equilibria and volumetric properties of the systems KCl—H2O and NaCl—KCl—H2O above 573 K: Equation of state representation," Geochim. Cosmochim. Acta. 57 (1993) 4885-4897. However, PR-BM and eNRTL models wrongly predict the enthalpy of salt water solution at supercritical conditions compared to the Driesner and AP EOS. As Driesner is one of the most commonly used models for electrolyte solutions under supercritical conditions, the Driesner EOS was selected to calculate the physical properties of the electrolyte solution (which contains primarily sodium chloride). To calculate the reactor size, kinetic parameters proposed by J. C. Meyer, P. A. Marrone, and J. W. Tester in "Acetic acid oxidation and hydrolysis in supercritical water," AICHE J., 41:2108-2121 (hereinafter "Meyer et al.") were used. The reaction kinetics model was also validated with experimental results of Meyer et al. with an error<14%.

Example 6

In this example, a SCWD process of the combined SCWO-SCWD was modeled. To calculate the thermophysical properties of the feed, the equation of state (EOS) proposed by Driesner was used. Let the feed mass flowrate and concentration be $\dot{m}_f$ and $X_f$. Where $\dot{m}_f$ unit is kg/s and $X_f$ is g/L. The feed salt concentration can be converted into weight (wt.) concentration ($W_f$) as:

$$W_f = \frac{X_f}{\rho_f} \tag{2}$$

where $\rho_f$ is the feed density. At supercritical conditions the feed gets separated into hydrothermal, highly concentrated brine ($W_b$) and SCW ($W_{SCW}$) in the separator. The net mass of SCW produced ($\dot{m}_{SCW}$) is:

$$\dot{m}_{SCW} = \dot{m}_f\left(\frac{W_b - W_f}{W_b - W_{SCW}}\right) \tag{3}$$

Eq. (3) is derived using mass balance and salt balance for the feed, SCW and brine. The net mass flowrate of brine produced is:

$$\dot{m}_b = \dot{m}_f - \dot{m}_{SCW} \tag{4}$$

The increase in brine temperature due to the SCWO results in an increase in the salt concentration of the brine. The high-temperature, high-pressure brine is then flashed in a series of flash tanks. The mass, salt, and energy balance for the flash tanks are given as:

$$\dot{m}_b = \dot{m}_{b,FT1} + \dot{m}_{s,FT1} + \dot{m}_{v,FT1} \tag{5}$$

$$\dot{m}_b W_b = \dot{m}_{b,FT1} W_{b,FT1} + \dot{m}_{s,FT1} \tag{6}$$

$$\dot{m}_b h_b = \dot{m}_{b,FT1} h_{b,FT1} + \dot{m}_{s,FT1} h_{s,FT1} + \dot{m}_{v,FT1} h_{v,FT1} \tag{7}$$

wherein $\dot{m}_{b,FT}$, $\dot{m}_{s,FT}$ and $\dot{m}_{v,FT}$ are the mass flowrate of brine, salt, and vapor produced by the flash tank, $h_{b,FT}$, $h_{s,FT}$ and $H_{v,FT}$ are the enthalpy of the brine, salt, and vapor. $W_{b,FT\ 1}$ is the salt wt. concentration at the first flash tank operating temperature ($T_{FT\ 1}$). Modeling of the second flash tank is done similarly. The brine produced from the second flash tank then flows into the evaporator to produce dry salts. The evaporator heat duty is given as:

$$\dot{q}_{evap} = \dot{m}_{salt,evap} h_{salt,evap} + \dot{m}_{v,evap} h_{v,evap} - \dot{m}_{b,FT2} h_{b,FT} \tag{8}$$

where $\dot{q}_{evap}$ is supplied by the vapor produced from the second flash tank, $\dot{m}_{salt,evap}$ and $\dot{m}_{v,evap}$ are the salt and vapor mass flowrate leaving the reactor.

Example 7

In this example, the use of different power cycles was modeled in conjunction with a combined SCWO-SCWD process. Even with feed pre-heating, the waste heat rejected from the SCWD system remains high. The SCW leaving the SCW HEX can be used as a heat source for a power cycle for energy generation. The performance of three different power cycles are compared, the three power cycles being a steam Rankine cycle, a re-heat Steam Rankine cycle, and a supercritical carbon dioxide ($sCO_2$) recompression Brayton cycle.

Figure 10A:
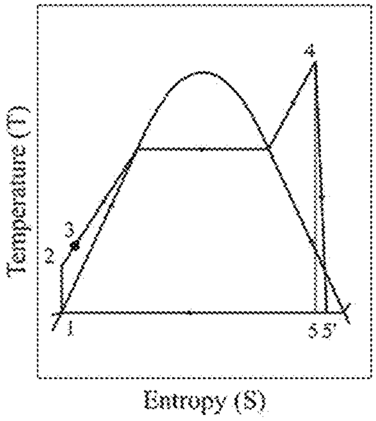
FIGS. 10A-10C are temperature-entropy diagrams from modeling a system using (i) a steam Rankine cycle (FIG. 10A); (ii) a re-heat steam Rankine cycle (FIG. 10B); and (iii) a recompression supercritical carbon dioxide (r-sCO2) Brayton cycle (FIG. 10C).
Figure 10B:
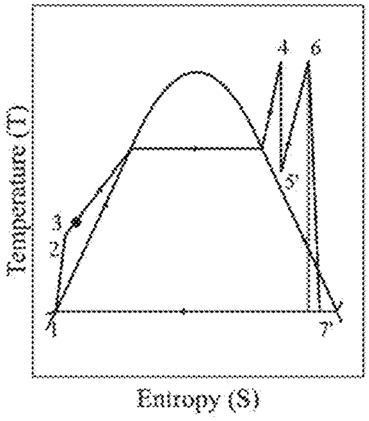
Figure 10C:
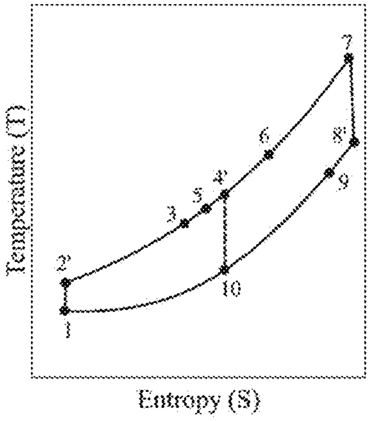

The temperature-entropy (TS) diagram for these cycles is shown in FIGS. 10A-10C. In the Rankine cycle, the superheated steam flows into the turbine to deliver power (Point 3, FIG. 10A). The steam leaving the turbine should have a dryness fraction>88% (Point 5', FIG. 10A).

The work delivered by the steam turbine ($\dot{w}_{turbine}$) is:

$$\dot{w}_{turbine} = \dot{m}_{steam}(h_4 - h_{5,isen})\eta_{isen,turbine} \tag{9}$$

where $\dot{m}_{steam}$ is the mass flowrate of steam, $h_4$ enthalpy of steam entering the turbine, $h_{5,isen}$ is the enthalpy assuming an isentropic expansion from the state 4 to 5 and $\eta_{isen,turbine}$ is the compressor isentropic efficiency. To improve power cycle efficiency, the water leaving the pump can be preheated with the help of distillate heat and compressor intercooler heat (see FIG. 2). This helps in increasing the water operating temperature from $T_2$ to $T_3$. The net heating supplied by SCWD to Rankine cycle ($\dot{q}_{Rankine}$) is:

$$\dot{q}_{Rankine} = \dot{m}_{steam}(h_4 - h_3) \tag{10}$$

The power cycle efficiency is given by:

$$\eta = \frac{\dot{w}_{turbine} - \dot{w}_{pump}}{\dot{q}_{Rankine}} \tag{11}$$

In the re-heat Steam Rankine cycle, the high-pressure superheated steam partially expands in the first stage turbine. It is re-heated back to its maximum operating temperature at pressure $P_5$ (where pressure $P_5<P_1$). The lower-pressure re-heated steam ($P_5$) then flows into the second turbine to deliver additional work. The re-heat Rankine cycle is modeled similar to Rankine cycle.

The other cycle considered is $sCO_2$ recompression cycle as it has higher efficiency and needs slight modification than the simple $sCO_2$ cycle. To enhance the heat integration and avoid the pinch point, $sCO_2$ leaving the second recuperator (Point 10 in FIG. 10C) is divided into two streams. The first stream flows into the main compressor and is heated with the second recuperator. The second stream flows in the re-compressor and is mixed with the first stream at point 5. The mixed stream is then heated in the first recuperator and to its maximum temperature in an external heater. The heated $sCO_2$ flows into the turbine to deliver work. The hot $sCO_2$ leaving the turbine acts as a heat source for the first recuperator and second recuperator.

The net compressor work is the summation of main compressor work and recompression work and is given as:

$$\dot{w}_{comp} = \dot{m}_{sCO_2}(1-r)\frac{(h_{2,s}-h_1)}{\eta_{isen,comp}} + \dot{m}_{sCO_2} r \frac{(h_{4,s}-h_{10})}{\eta_{isen,comp}} \quad (12)$$

where r is the recompression ratio, and is the ratio of $sCO_2$ flowing to recompression to the net $sCO_2$ flowrate, and $\eta_{isen,comp}$ is the compressor isentropic efficiency. The net heat supplied to $sCO_2$ process, turbine work, and efficiency can be calculated in a manner similar to equations 9-11. The power cycle are designed with an objective to maximize its energy efficiency.

Example 8

This example describes input parameters and feed water composition (e.g., produced water composition) used to model use of a system and method embodiment of the present disclosure. In this example, the salt is primarily NaCl, while for the organic material, acetic acid is the major constituent, followed by benzene. The net organic material (e.g., hydrocarbon) concentration is 10.6 g/L, while the NaCl concentration is 100 g/L. These compositions are typical of produced water. Table 3 provides the input parameters that were used and Table 4 provides the feed water composition that was used. Results from the model are described.

TABLE 3

| Parameter | Value | Unit |
|---|---|---|
| Operating pressure | 250 | bar |
| Operating temperature | 420 | ° C. |
| Feed temperature | 25 | ° C. |
| Distillate cooled temperature | 35 | ° C. |
| Heat transfer coefficient (SCW HEX) | 1.5 | $kW/m^2K$ |
| Heat transfer coefficient (pre-heater and other HEX) | 1 | $kW/m^2K$ |
| $\eta_{isen,t}$ | 0.9 | |
| $\eta_{isen,c}$ | 0.9 | |
| Electricity cost | 0.08 | $/kWhe |
| FCR | 7 | % |
| CF | 90 | % |
| Natural gas cost | 3.88 | $\$/GJ_{th}$ |
| Individual cost component | Econexpert | |
| Pressure exchanger cost | $\left(\frac{607.5}{525.4}\right)3134.7(3.6F_{PX})^{0.58}$ | $ |
| $\eta_{pump}$ | 0.84 | |
| $\eta_{PHX}$ | 0.95 | |
| $\eta_g$ | 0.99 | |
| Indirect | 30 | % |
| Contingency | 18 | % |
| Cooling pumping head | 30 | m |

TABLE 3-continued

| Parameter | Value | Unit |
|---|---|---|
| $sCO_2$ power cycle cost | 1.03 | $M\$/MW_e$ |
| Oxygen | 0.05 | $/kg |
| Plant size | 5000 | $m^3/d$ |

TABLE 4

| Component | Amount | Unit |
|---|---|---|
| NaCl | 100 | g/L |
| $CH_3COOH$ | 10 | g/L |
| $C_5H_{12}$ | 38 | mg/L |
| $C_6H_6$ | 600 | mg/L |
| $C_{16}H_{10}$ | 3 | mg/L |
| Net Hydrocarbon | 10.6 | g/L |

Figure 11A:
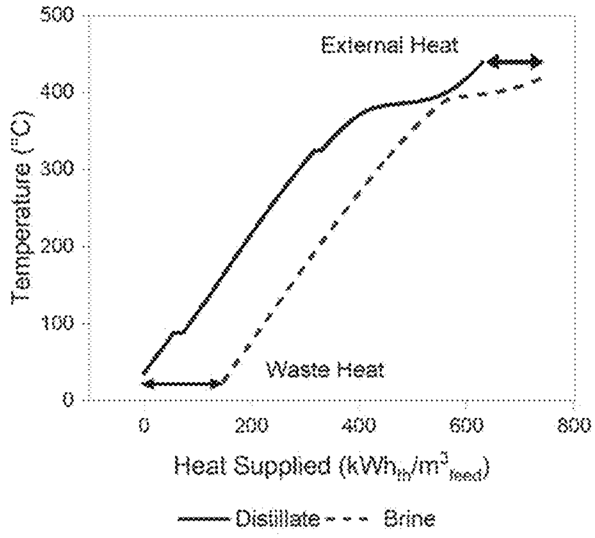
FIGS. 11A and 11B are graphs showing (i) a composite curve profile modeled for an exemplary SCWD-SCWO system without any heat extraction for the power cycle (FIG. 11A); and (ii) a modified composite curve profile for SCWD-SCWO with heat extraction for the power cycle (FIG. 11B), wherein the feed water salt concentration is 100 g/L, hydrocarbon content is 10.6 g/L, and the minimum pinch temperature is fixed at 10° C.

FIG. 11A shows the composite curve for integrated SCWD-SCWO with 10.6 g/L organic hydrocarbon species and 100 g/L inorganic salt. The solid curve represents the net heat released by the SCW, gases, and distillate, while the dashed line shows the energy used for feed pre-heating. The feed (produced water) is heated to 420° C., and SCWO increases the temperature of SCW and the brine to 439.7° C. The increase in SCW and brine temperatures increases the feed pre-heating, and the net external heating requirement for the NG boiler is 116.8 $kWh_{th}/m^3_{feed}$ (with 10.6 g/L hydrocarbon). If the heat of SCW, gases, and distillate are used only for feed pre-heating, then 149.4 $kWh_{th}/m^3_{feed}$ should be rejected as waste, as shown in FIG. 11A. A four-stage inter-cooled compressor is used to compress the oxygen to 250 bar. The net mass of oxygen used is 13.9 $gram/kg_{feed}$. The compression work used is 2.4 $kWh_e/m^3_{feed}$.

Figure 11B:
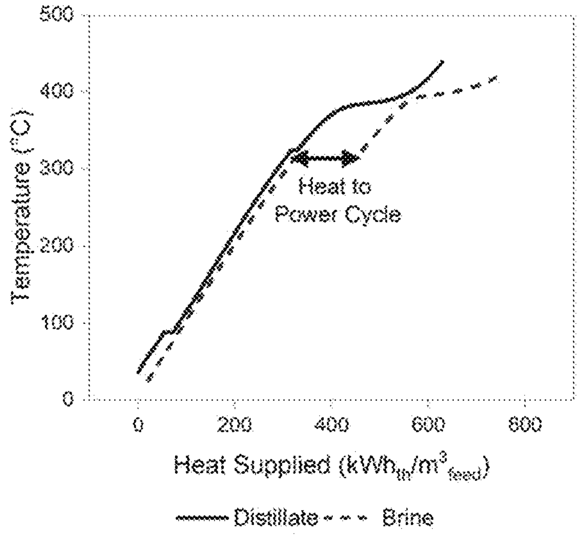

To recover the waste heat of the SCWD-SCWO system, the composite curve is modified and shown in FIG. 11B. Specifically, SCW and gases coming out from SCW HEX and the vapor produced from brine flashing are used as a heat source for the power cycle working fluid. SCW leaves the SCW HEX at 383° C.; thus, the power cycle working fluid can be heated to 373° C. and the net heat supplied by the hot distillate is 126.8 $kWh_{th}/m^3_{feed}$. The heat released from oxygen cooling in a multi-stage compressor and by the SCW leaving the feed pre-heater is used to pre-heat the power cycle working fluid to 62° C.

Figure 12A:
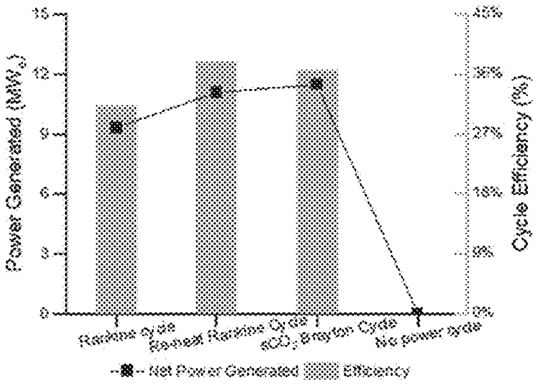
FIGS. 12A and 12B are graphs showing modeled power cycle performance as a function of (i) a power cycle thermal to electrical conversion efficiency and power generation (FIG. 12A); and (ii) equivalent electrical energy consumption and LCOW (FIG. 12B).

With the operating temperature of the working fluid fixed at 373° C., the power cycle thermal to electrical conversion efficiency achieved for the steam Rankine cycle is 31.2%, re-heat Rankine cycle is 37.8%, and $sCO_2$ recompression Brayton cycle is 36.6%, as shown in FIG. 12A. The optimal operating pressures are: 18.4 and 0.06 bar for the steam Rankine cycle, 133.9, 18.3 and 0.06 bar for re-heat Rankine cycle, and 250 and 83 bar for $sCO_2$ recompression Brayton cycle. The recompression fraction for $sCO_2$ Brayton cycle is 0.345. The power delivered is 9.3, 11.1, and 10.9 MWe for steam, re-heat Rankine cycle, and $sCO_2$ recompression Brayton cycle (see FIG. 12A), respectively.

Figure 12B:
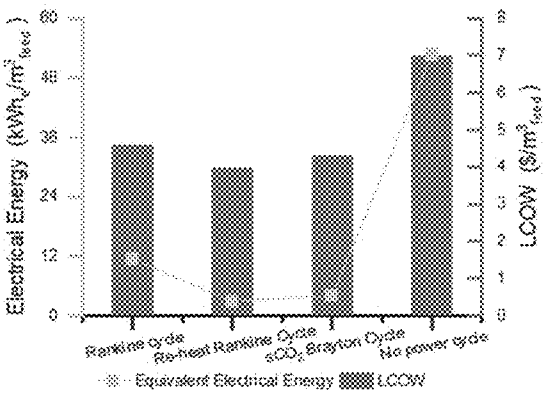

The net external heat duty for the NG boiler (associated with heating the feed) is constant at 116.8 $kWh_{th}/m^3_{feed}$ for all the power cycles. The net heat supplied by the NG heater can be converted to equivalent electrical energy (using a thermal to electrical conversion efficiency of 41%, calculated for $sCO_2$ Brayton cycle 420° C.), giving a net boiler duty of 47.9 $kWh_e/m^3_{fee}$. In addition, 2.4 $kWh_e/m^3_{feed}$ electrical energy is used to compress oxygen, 2.7 $kWh_e/m^3_{feed}$ is used for feed pumps, and 0.6 $kWh_e/m^3_{feed}$ is used to pump cooling water. The electricity used for operation is subtracted from the net electricity generated to calculate the net equivalent electricity requirement. The net equivalent electricity requirement for the steam Rankine cycle is 11.4 $kWh_e/m^3_{feed}$. It is reduced to 2.9 and 4.1 $kWh_e/m^3_{feed}$ for re-heat Rankine and $sCO_2$ recompression Brayton cycles (see FIG. 12B). If the power-generation cycle is not used, the net equivalent electrical energy requirement with 10.6 g/L hydrocarbon and 100 g/L salt is 52.6 $kWh_e/m^3_{feed}$.

Interestingly, the performance of SCWD-SCWO improves with increasing hydrocarbon content in the feed water. The LCOW is reduced from 3.5 to 2.2 $\$/m^3_{feed}$, while the net energy requirement decreases from 18 to −60 $kWh_e/m^3_{feed}$ as the hydrocarbon content is increased from 0-53 g/L. A negative energy requirement signifies that the integrated SCWD and SCWO process constitutes a net positive energy generation system. For water with very low organic content, this technology proves to be very economical with a treatment cost of approximately 2.8 $\$/m^3_{feed}$. And, it was observed that the produced water treatment cost is largely independent of the brine concentration. The treatment cost is essentially constant at 3.2 $\$/m^3_{feed}$ as the brine concentration is increased from 35 to 250 g/L, while the hydrocarbon content is fixed at 10.6 g/L. Compared to commercially used water treatment processes, the proposed SCWD-SCWO is around 100% more energy efficient and 70% more cost-efficient for a 250 g/L brine concentration.

In the following examples, a SCWDO process is evaluated experimentally with a focus on potential application to produced water. The effects of different salt and organic components commonly found in produced water were explored first, using simulated brines. Heat release due to organic oxidation was experimentally validated (Example 9). Testing of four different produced water samples enabled characterization of the effectiveness of the SCWDO process (Example 10). Because SCWDO could also play a critical role in supporting a hydrogen economy without relying in freshwater supplies, a SCWDO-hydrogen generation process is proposed with produced water as a feed source (Example 11).

Example 9

In this example, different organics were used to probe the behavior of oxidation reactions under supercritical conditions. To demonstrate the capability of the combined SCWDO system, acetic acid and xylenes were used as model organic compounds in the oxidation reaction. Acetic acid is one of the most common organic constituents present in produced water, while xylenes are organic compounds that are representative of benzene, toluene, ethyl benzene, and xylenes (BTEX) most commonly found in produced water. These organics are subject to strict concentration regulations due to their effects on human health and the environment. Hydrogen peroxide was used as the oxidizing agent and was supplied at 10% over the stoichiometric amount required for complete oxidation of the organics. Once the system reached steady state with water, the feed was switched to a solution, either water or brine, with added acetic acid and/or xylenes and hydrogen peroxide. Samples were taken of the distillate and analyzed for acetic acid content using a Megazyme Acetic Acid Assay with a Themo Insight II spectrophotometer and for xylenes using an Agilent gas chromatograph-mass spectrometer (GC-MS) with headspace analyzer.

Heat generation experiments and supporting modeling were conducted to help demonstrate the capability of organic compound oxidation to remove organic constituents as well as lower the cost of SCWD process through internal heat generation. Acetic acid was used as the organic reactant for ease of distillate analysis. Once the reactor reached a steady state with water, the temperature was recorded and the feed was quickly switched to the reactive solution. The system was then allowed to reach a second steady state. The temperature was recorded again, and the distillate was collected to determine the extent of the oxidation reaction. Once the distillate was collected, the reactive solution was switched back to water, and the system was allowed to reach a third steady state. The temperature difference between water and the reactive solution was used to estimate the heat generated from the reaction.

Figure 13A:
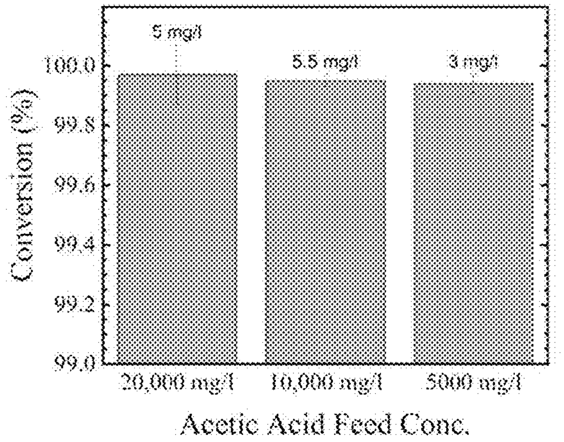
FIGS. 13A-13C are graphs showing (i) the percent conversion of acetic acid as a function of acetic acid feed content (FIG. 13A); (ii) the net heat released through oxidation of acetic acid (FIG. 13B); and (iii) organic conversion of xylenes and acetic acid as a function of xylene feed concentration (FIG. 13C).

FIG. 13A shows the net oxidation of acetic acid as a function of feed concentration. Specifically, FIG. 13A shows the percent conversion of organic material as a function of organic feed content. The concentration labeled at the top of each bar in FIG. 13A is the distillate acetic acid concentration. As shown in FIG. 13A, the oxidation was independent of the acetic acid feed concentration, with the distillate concentration approximately plateauing at 5 mg/L. To ensure the presence of salt would not interfere with the reaction, the 5,000 mg/L acetic acid experiment was then conducted with the addition of 10,000 mg/L NaCl. The resulting distillate still contained only 5 mg/L of acetic acid. These reactions showed that SCWO was capable of removing over >99.9% of the organics and that salt concentration has little effect on the reaction.

Figure 13B:
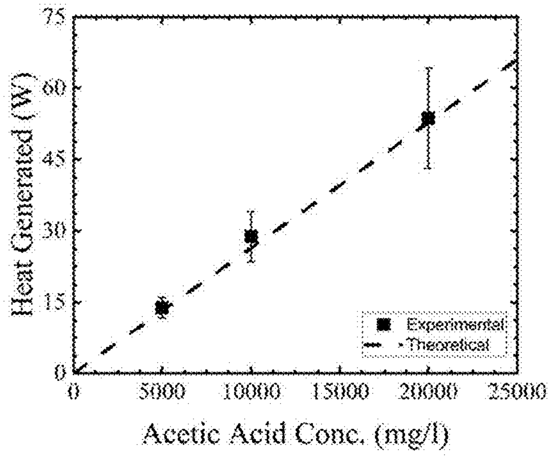

Oxidation of the organics releases energy which can effectively be utilized as an internal heat source to minimize external energy requirements. As shown in FIG. 13B, net heat released due to organic oxidation was found to be proportional to the feed concentration. Specifically, FIG. 13B shows the net heat released through oxidation of acetic acid as a function of the concentration of acetic acid, with a feed flow rate of 5 mL/min. The solid line in FIG. 13B represents the heat released using the value reported by Cocero et al. The experimental value of the net heat released was calculated based on the temperature rise recorded by a thermocouple, which was then converted to equivalent heat added for a feed flowrate of 5 mL/min. The heat of combustion was calculated to 925 kJ/mol, while the literature reports 950 kJ/mol for acetic acid oxidation.

Competing oxidation reactions in produced water could have an impact on the overall conversion of organic material. This was evaluated using organics that are highly regulated for drinking water, such as benzene, toluene, ethyl benzene, and xylene (BTEX). These organic compounds are regulated not only due to their high solubility in water, but also due to their effects on the human body. To evaluate how competing oxidation reactions would affect overall conversion, acetic acid and xylenes were oxidized together under supercritical conditions.

Figure 13C:
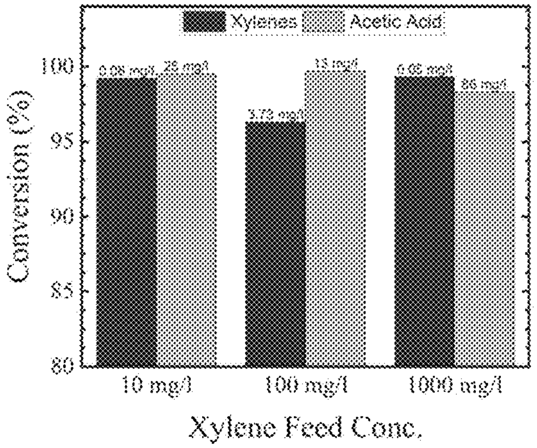

FIG. 13C shows the conversion of both xylenes and acetic acid. Specifically, FIG. 13C shows the conversion of xylenes and acetic acid as a function of xylene feed concentration, while the acetic acid concentration was kept at 5000 mg/L. Xylene content was determined through GC-MS analysis with headspace analyzer while acetic acid content was determined through spectrophotometry with an acetic acid survey kit. Each result is an average of n=3 samples with error bars corresponding to the standard deviation. $H_2O_2$ concentration was kept at 10% excess for complete oxidation of all organics in the presented experiments. The conversion for both of these organics showed>98% of the organic content was oxidized. This result suggests that reaction of both organics, as long as the oxidizing agent is in excess, does not negatively affect the oxidation process.

Example 10

Produced water can include and/or be complex mixture of various inorganic and organic salts. Alkali and alkaline earth metal ions behave differently in supercritical water compared to monovalent metal ions. The magnesium and calcium chloride salts at temperature>200° C. precipitate in the form of hydroxide salts, and the chlorides get converted to hydrochloric acid through an ion exchange mechanism with water. Due to hydrochloric acid formation, the pH of the solution increases. On the other hand, sodium and potassium chloride are non-reactive in supercritical water even at temperature>400° C.

In this example, tests were performed using produced water samples from the Permian Basin (New Mexico), the Eagle Ford Basin (Texas), and the Anadarko Basin (Oklahoma), as well as using a synthetic produced water sample modeling produced water from the San Juan Basin (New Mexico). Synthetically produced brines were prepared using the most prevalent components reported in the USGS survey of produced water samples for the San Juan and Permian Basin regions. The salt composition of the synthetic brine closely mimicked that of natural samples. The salts were dissolved in water and allowed to equilibrate for 24 hours. Afterward, the brine was filtered via vacuum filtration through a 5-μm SVLP filter. The brine was then stored in a sealed bottle at room temperature until used in an experiment.

Figure 14:
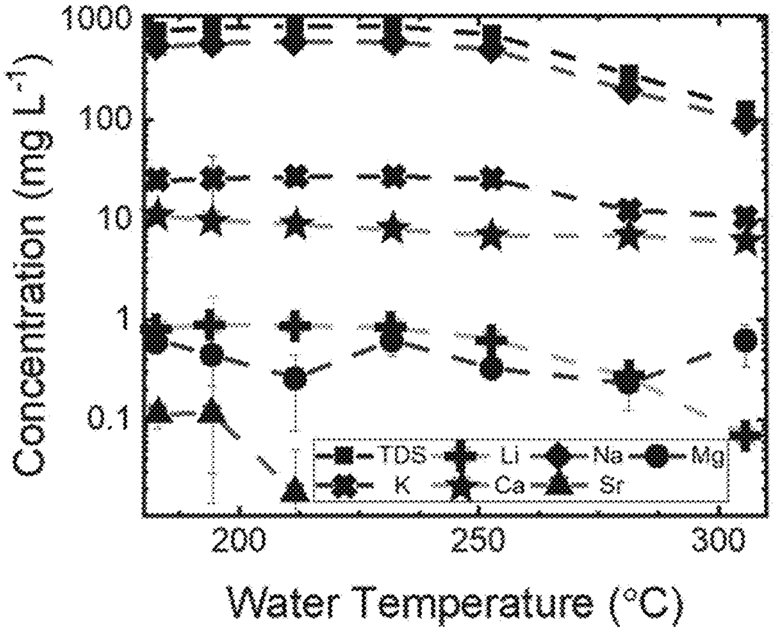
FIG. 14 is a graph showing distillate concentrations of various cations in a simulated brine as a function of water temperature.

FIG. 14 shows the temperature-concentration curve for desalination with the simulated San Juan Basin brine. This produced water was selected due a lower concentration of TDS that would not overtax the bench-scale reactor system and the analytical techniques required to determine ion concentrations. As seen in FIG. 14, the strontium, calcium, and magnesium concentrations decrease before the sodium, lithium, and potassium concentrations decrease. This behavior validates observations seen in competing anion experiments as well as observations between alkali and alkaline earth metals cited in literature. The divalent ions solubility decreases at temperature<250° C., in from of hydroxide ion and simultaneously the chloride ion forms hydrochloric acid. The pH of the system decreased from a feed pH of 6.9 to a distillate pH of 5.6 at a water temperature of 400° C. These experiments demonstrate that ions in produced water can be separated based on the cation valance and can decrease solubility, which can limit hydrolysis. All ion concentrations shown in FIG. 14 were determined using ICP-MS analysis while the TDS measurement was taken using the TDS probe. All points are an average of three samples with error bars corresponding to one standard deviation. Synthetic produced water samples for the San Juan Basin were prepared using produced water data from the USGS.

Tables 4-7 show the brine and distillate compositions obtained for the synthetic San Juan Basin brine and natural samples from the Eagle Ford, Permian, and Anadarko Basins, respectively. In all cases, the overall salt content in the distillate falls below the U.S. recommended drinking water limit of 500 mg/L. However, the distillate pH from each brine was lower than the recommended value of 5.5, with the San Juan being pH 5.1±0.2 and the Permian Basin being pH 3.2±0.3. This suggests that the hydrolysis of alkaline earth metals is higher than expected and decreases the pH to slightly below the required threshold. SCWDO was also able to oxidize over 99% of the organics in all brines, as seen in Tables 4-7. The variation in oxidation could be due in part to the hydrogen peroxide oxidizing agent reacting with the carbonate and bicarbonate ions in solution to form water and $CO_2$. Decreased anion and hydrogen peroxide concentrations could allow for both an increased hydrolysis as well as a decrease in organic conversion. However, these experiments do suggest that produced water could be effectively treated in a larger size (higher residence time) reactor and further optimization should result in drinking water-quality distillates. The values shown in Tables 4-7 are averages of n=3 samples. The cations were determined though ICP-MS analysis while the acetic acid concentration was determined through the Acetic Acid Assay from Megazyme.

TABLE 4

| San Juan Basin (Synthetic Sample) | | | |
|---|---|---|---|
| | Feed (mg/L) | Distillate (mg/L) | Removal (%) |
| TDS | 17,000 | 277 | 98.4 |
| Li | 7.5 | 0.2 | 97.3 |
| Na | 545 | 92.6 | 98.3 |
| Mg | 345 | 0.4 | 99.9 |
| K | 178 | 11.9 | 93.3 |
| Ca | 82 | 6.5 | 92.1 |
| Sr | 14.2 | 0.001 | 99.9 |
| TOC | 4,000 | 1.4 | 99.9 |

TABLE 5

| Eagle Ford Basin | | | |
|---|---|---|---|
| | Feed (mg/L) | Distillate (mg/L) | Removal (%) |
| TDS | 35,000 | 325 | 99.1 |
| Li | 15 | 0 | 98.5 |
| Na | 1,122 | 109 | 90.3 |
| Mg | 710 | 0 | 99.9 |
| K | 366 | 14 | 96.2 |
| Ca | 169 | 8 | 95.5 |
| Sr | 29 | 0 | 100.0 |
| TOC | 156 | 1 | 99.8 |

TABLE 6

| Permian Basin | | | |
|---|---|---|---|
| | Feed (mg/L) | Distillate (mg/L) | Removal (%) |
| TDS | 189,000 | 356 | 99.8 |
| Li | 25 | 1.5 | 94.2 |
| Na | 63,570 | 90.8 | 99.9 |
| Mg | 2,464 | 3 | 99.9 |
| K | 1,182 | 39.8 | 96.6 |
| Ca | 5,600 | 9.7 | 99.8 |
| Sr | 175.8 | 0.2 | 99.9 |
| TOC | 99.5 | 0 | 100.0 |

TABLE 7

| Anadarko Basin | | | |
|---|---|---|---|
| | Feed (mg/L) | Distillate (mg/L) | Removal (%) |
| TDS | 284,000 | 256 | 99.9 |
| Li | 0 | 0 | 0.0 |
| Na | 94,010 | 101 | 99.9 |
| Mg | 2,910 | 0 | 100.0 |

TABLE 7-continued

| Anadarko Basin | | | |
|---|---|---|---|
| | Feed (mg/L) | Distillate (mg/L) | Removal (%) |
| K | 478 | 0 | 100.0 |
| Ca | 1,140 | 0 | 100.0 |
| Sr | 1,330 | 0 | 100.0 |
| TOC | 120 | 0 | 100.0 |

Optimization of the SCWDO process is necessary in order to generate clean drinking water from produced water. One of the main challenges encountered during desalination is the hydrolysis reaction that takes place with alkaline earth metals. This reaction not only increases the TDS of the distillate but also decreases the distillate pH. To meet the acceptable pH threshold, an appropriate amount of sodium hydroxide could be added in the distillate. In this example, the San Juan Basin distillate would require approximately 8 μmol/L, while Permian Basin water would need around 0.5 mmol/L of sodium hydroxide. This post treatment of the distillate to meet the pH threshold would increase the TDS by 0.5 mg/L for the San Juan Basin synthetic produced water and 30 mg/L for Permian Basin produced water.

Example 11

In this example, the applicability of SCWDO to hydrogen production is explored. Hydrogen is expected to play a vital role in decarbonizing the energy and transportation sectors. However, hydrogen production requires large amounts of high purity feed water, consuming 4 gal/kg-$H_2$ for steam methane reforming (with carbon capture). Large-scale $H_2$ production will have to compete for increasingly scarce freshwater resources. This will increase stress on fresh water supplies, especially in arid regions. One possible solution is to use high-volume, low-quality water sources such as produced water. Using produced water as feed source might involve co-locating $H_2$ production with gas extraction. This will not only reduce the clean water stress but also reduce the carbon footprint associated with hydrogen production. Since transporting natural gas leads to methane leakage, co-locating $H_2$ plants within natural gas basins could also limit methane emissions. In addition to electrolysis, treated produced water could also be used in other hydrogen production techniques.

Figure 15:
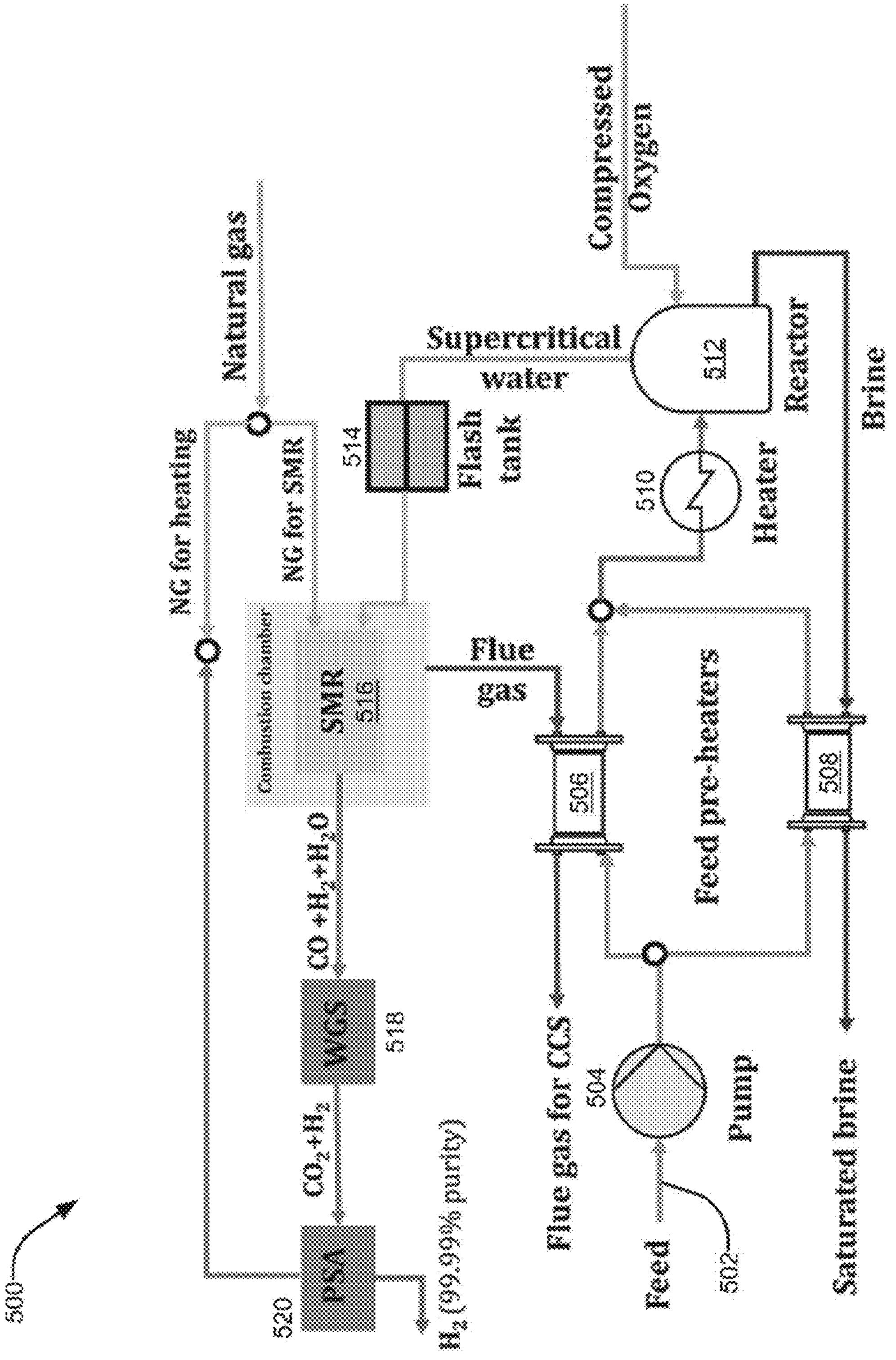
FIG. 15 is a schematic illustrating an exemplary integrated system embodiment for performing SCWO in combination with SCWD in a steam methane reforming process.

FIG. 15 is a process flow diagram illustrating a system 500 in which the hot supercritical distillate generated from SCWDO is used as both a heat energy and water source for the integrated Steam Methane Reforming (SMR) process for $H_2$ production. The process is attractive as it involves only one physical separation and one chemical reaction and conserves energy in three ways. First, heat energy is utilized by integrating the system with preheaters to boost efficiency and lower heat-input requirements. Second, the (exothermic) heat of oxidating organics is harvested. Third, two processes (SCWDO and SMR) that require hot water are integrated with only one heating step, which in turn, enhances overall energy efficiency.

In the example of FIG. 15, a feed 502 including produced water is introduced into a pump 504, which facilitates pressurizing the feed. Pressurized feed is then pre-heated by passing it to feed pre-heaters 506 and 508. The partially heated feed is then heated to operating temperature in heater 110, which provides a supercritical feed. The supercritical feed is then sent to oxidation reactor 512, wherein supercritical water oxidation occurs using compressed oxygen, such as may be supplied by a multi-stage compressor (such as multi-stage compressor 114 disclosed herein). The hot supercritical distillate then exits oxidation reactor 512 and is flashed in flash tank 514 to generate a salt-free vapor stream that is supplied to SMR reactor 516. Oxidation reactor 512 additionally produces a brine from the partially heated feed, which is cooled in heat exchanger 508 to produce a saturated brine. In SMR reactor 516, the vapor produced from the supercritical feed is reacted with natural gas feed to produce a syngas that is purified into high-purity hydrogen gas via water-gas shift reactor 518 and pressure swing adsorption unit 520. SMR reactor 516 also produces a hot flue gas that is fed to feed pre-heater 506 to pre-heat the pressurized feed as discussed above and that subsequently undergoes $CO_2$ sequestration.

By direct use of steam generated from the SCWDO process, the energy requirement for a SMR process can be reduced by an estimated 33% and the cost of $H_2$ production can be reduced by 15%. In addition, due to sequestration of the $CO_2$ generated during processing the tax credit applies and the clean $H_2$ production cost can be reduced to 1 $/kg. When produced water is used in hydrogen production, the heat-of-oxidation of the organics can be leveraged to provide process heat required for de-salting water. Additionally, the heat added to the supercritical water as a result of the oxidation of organics can further energize the endothermic SMR reaction within the SMR reactor 516, relaxing the requirement that such heat energy be provided by combustion of natural gas. This approach reduces emissions and energy requirements while functionally eliminating all organics in the output distillate.

In view of the many possible embodiments to which the principles of the present disclosure may be applied, it should be recognized that the illustrated embodiments are only preferred examples of the disclosure and should not be taken as limiting the scope of the disclosure. Rather, the scope is defined by the following claims. We therefore claim as our invention all that comes within the scope and spirit of these claims.

We claim:

1. A system, comprising:

a feed pump that pressurizes a feed water;

a heater and/or a supercritical heat exchanger that is fluidly coupled to the feed pump to receive and pre-heat the feed water expelled from the feed pump;

a boiler that is fluidly coupled to the heater and/or the supercritical heat exchanger, wherein the boiler receives the pre-heated feed water from the heater and/or the supercritical heat exchanger and heats the pre-heated feed water received from the heater and/or the supercritical heat exchanger to produce a supercritical feed that comprises supercritical water;

a reactor that is fluidly coupled to the boiler to receive the supercritical feed from the boiler, wherein the reactor comprises an oxidant capable of inducing supercritical water oxidation so as to provide a supercritical water product comprising supercritical water, a gas, a salt, or a combination thereof; and a separator that is fluidly coupled to the reactor to receive the supercritical water product from the reactor, wherein the separator promotes separation of the supercritical water and the gas from the salt, wherein the salt is in a form of a hydrothermal concentrated brine.

2. The system of claim 1, further comprising a compressor that converts oxygen to the oxidant present in the reactor, wherein the compressor is fluidly coupled to the reactor.

3. The system of claim 1, wherein the oxidant comprises compressed oxygen.

4. The system of claim 1, further comprising a turbine, a cooler, a pump separate from the feed pump, and a heat exchanger separate from the supercritical heat exchanger, wherein the supercritical heat exchanger receives the supercritical water from the separator, wherein the heat exchanger produces steam using the supercritical water leaving the supercritical heat exchanger, wherein the heat exchanger is fluidly coupled to the turbine to deliver the steam to the turbine, wherein the turbine is fluidly coupled to the cooler to deliver the steam from the turbine to the cooler, and wherein the cooler is fluidly coupled to the pump.

5. The system of claim 4, wherein the turbine produces electricity from the supercritical water obtained from the separator.

6. The system of claim 1, further comprising:

a pressure exchanger that is fluidly coupled to the feed pump that pressurizes the feed water;

one or more flash tanks that are fluidly coupled to the separator, wherein the one or more flash tanks produce a dry salt and vapor from the hydrothermal concentrated brine;

a vapor feed pre-heater that is fluidly coupled to the one or more flash tanks, wherein the vapor pre-heater uses the vapor from the one or more flash tanks to heat the feed water;

an evaporator that is fluidly coupled to the one or more flash tanks;

a salt feed pre-heater that is fluidly coupled to the evaporator; and a cooler that is fluidly coupled to the pressure exchanger, wherein the feed pump is fluidly coupled to the pressure exchanger and pressurizes the feed water to a higher pressure than that provided by the pressure exchanger, wherein the heater is fluidly coupled to the feed pump to pre-heat the feed water expelled from the feed pump, wherein the supercritical heat exchanger is fluidly coupled to the heater and heats the feed water to a higher temperature than that provided by the heater.

7. The system of claim 6, further comprising a capacitive deionization cell that is fluidly coupled to the pressure exchanger.

8. The system of claim 6, wherein the one or more flash tanks comprises a first flash tank and a second flash tank, wherein the first flash tank is fluidly coupled to the separator, wherein the first flash tank produces a first portion of the vapor from the hydrothermal concentrated brine, wherein the second flash tank is fluidly coupled to the first flash tank, wherein the second flash tank produces a second portion of the vapor from the hydrothermal concentrated brine, and wherein the vapor feed pre-heater uses the second portion of the vapor to heat the feed water.

9. The system of claim 1, further comprising a recompression Brayton cycle set-up, comprising a supercritical $CO_2$ ($sCO_2$) heater, a $sCO_2$ turbine, a low temperature recuperator, a high temperature recuperator, a $sCO_2$ cooler, a $sCO_2$ compressor, and a $sCO_2$ re-compressor; wherein the system is fluidly coupled to the $sCO_2$ heater.

10. The system of claim 1, wherein the system is a portable system.

11. The system of claim 1, wherein the system is configured to be retrofitted to an existing processing system.

12. The system of claim 1, wherein the system is capable of a net energy requirement of about zero for hydrocarbon concentration of 10 g/L and is a net power generating system for higher hydrocarbon concentration.

13. The system of claim 1, wherein a performance of the system is independent of salt concentration.

* * * * *